United States Patent [19]
Bruchman

[11] Patent Number: 5,918,868
[45] Date of Patent: Jul. 6, 1999

[54] UNIVERSAL MODULAR FIXTURING SYSTEMS

[75] Inventor: Asher Bruchman, Petach Tikvah, Israel

[73] Assignee: Techcom Technical Computerized Fixturing Ltd., D.N. Hefer, Israel

[21] Appl. No.: 08/396,036

[22] Filed: Feb. 28, 1995

[51] Int. Cl.⁶ .................................................. B25B 5/04
[52] U.S. Cl. .......................... 269/238; 269/48.1; 269/91; 269/95; 269/900
[58] Field of Search ................................ 269/91, 92, 93, 269/94, 157, 238, 250, 251, 900, 34, 237, 239, 161, 220

[56] References Cited

U.S. PATENT DOCUMENTS

| | | | |
|---|---|---|---|
| 534,331 | 2/1895 | Hodgson | 269/49 |
| 710,544 | 10/1902 | Wandell | 269/238 |
| 714,208 | 11/1902 | Long | 269/250 |
| 2,326,387 | 7/1943 | Frederickson | 269/94 |
| 2,945,523 | 7/1960 | Jenkins | 269/238 |
| 3,380,730 | 4/1968 | Carver | 269/94 |
| 3,967,816 | 7/1976 | Ramsperger et al. | 269/95 |
| 4,120,490 | 10/1978 | Carossino | 269/94 |
| 4,362,261 | 12/1982 | Cook, Jr. | 269/34 |
| 4,540,164 | 9/1985 | Shade, Jr. | 269/93 |
| 4,669,227 | 6/1987 | Treppner | 269/900 |
| 4,858,901 | 8/1989 | Okuyama et al. | 269/34 |
| 5,275,391 | 1/1994 | Lynn et al. | 269/94 |

FOREIGN PATENT DOCUMENTS

| | | |
|---|---|---|
| 601787 | 6/1960 | Italy . |
| 1206047 | 1/1986 | U.S.S.R. . |
| 1349987 | 11/1987 | U.S.S.R. . |
| 618288 | 2/1949 | United Kingdom .................. 269/237 |

Primary Examiner—Robert C. Watson
Assistant Examiner—Thomas W. Lynch
Attorney, Agent, or Firm—Mark M. Friedman

[57] ABSTRACT

A fixturing device, usable with various fixturing components as a universal modular fixturing system, has a slot and a shaft, the slot and the shaft intersecting and having a common plane of symmetry, the fixturing device having a plurality of transverse bores intersecting the slot and the shaft, perpendicular to the plane of symmetry. The fixturing device is used according to one or more of three clamping techniques. The first clamping technique is back-clamping in which a workpiece having a threaded recess is clamped by a bolt from the back of the slot. The second clamping technique is relocatable clamping in which a clamp support supporting a clamp clamping a workpiece is displaceable along the shaft. The third technique is lever-arm clamping in which a lever arm, pivotally mounted on a pin located in one of the transverse bores, is rotated to clamp a workpiece. The fixturing device also has an array of threaded recesses for attaching a fixturing component, an array of accurately positioned bores for locating a fixturing component and a groove for aligning a fixturing component.

10 Claims, 19 Drawing Sheets

FIG.1B
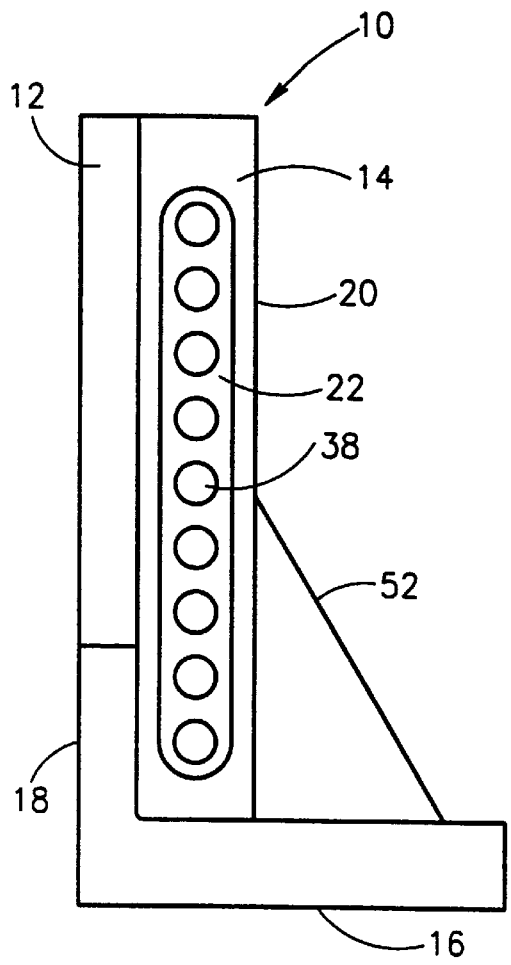
FIG.1C
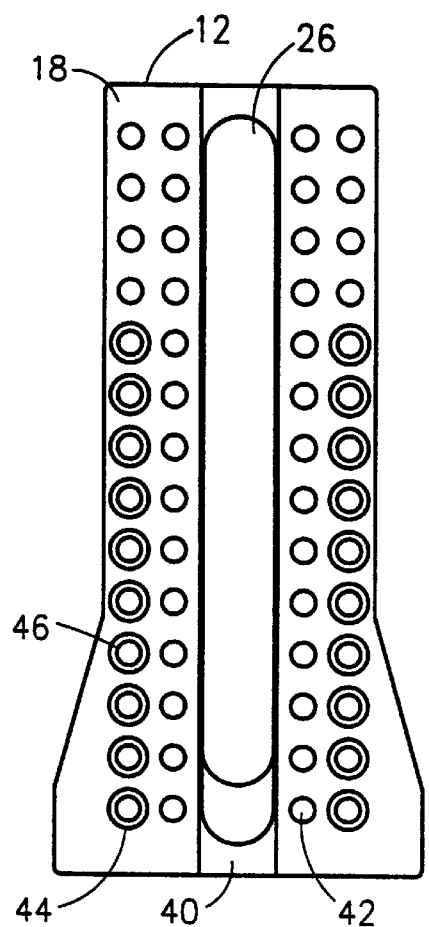
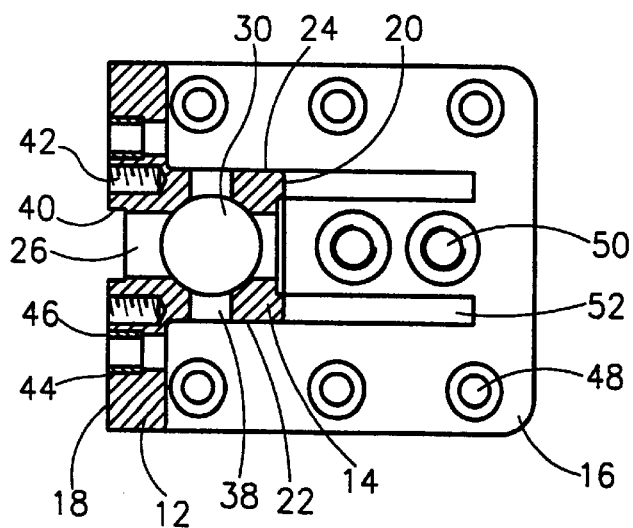
FIG.1D

UNIVERSAL MODULAR FIXTURING SYSTEMS

FIELD AND BACKGROUND OF THE INVENTION

The present invention relates to fixturing systems for clamping a workpiece during machining in general. In particular it concerns a fixturing device for use in universal modular fixturing systems for clamping a variety of workpieces during grinding, milling, boring or other machining procedures.

Conventional fixturing requires the design and production of a fixture specific to any given workpiece and is therefore time consuming and expensive. The combined labor of design and production for a typical fixture may take a technician as much as a hundred hours. The expenses of such work may be feasible for large scale manufacture, but are often prohibitive for smaller scale applications.

In an attempt to reduce production time and costs a number of modular fixturing systems have been developed. These modular fixturing systems generally have a flat base plate with a variety of attachable supporting elements and clamping elements. By building up different combinations of the elements it is possible to produce fixtures to support a range of different workpieces.

Modular fixturing systems are generally of one of two types or a combination thereof. One type uses a base plate drilled with a matrix of accurately positioned holes. This enables precise and repeatable positioning of supporting and clamping elements. Systems of this type are commercially available from ERON and CARR LANE.

The other type of modular fixturing system is the slotted grid system in which the supporting and clamping elements slide into T-shaped slots and are tightened by means of bolts to grip the recessed surfaces of the slots. Systems of this type are commercially available from HALDER and KUIKKA.

Use of the modular systems currently available is limited to a relatively small proportion of workpieces. One reason for the limited application of such systems is that fixture design is restricted by the fixed pitch between the holes or slots and many workpieces may need supporting or clamping at intermediate positions. In particular, in the systems based on a matrix of accurately positioned holes, the design is limited by the position of the holes. The holes commonly form a matrix with a pitch of 30 mm. alternating between threaded bores and locating bores. The effective pitch between similar bores is therefore 60 mm.

A further shortcoming of the existing systems has become highly significant in the light of recent developments in machining methods. The development of machining centers and various types of numerical control machines has enabled multiple processes to be performed consecutively. To do this, however, all the surfaces of the workpiece which are to be processed must be sufficiently accessible. When modular fixturing systems are used, the combination of a base plate with sufficient supporting and clamping elements attached to its face in most cases greatly limits access to the workpiece, preventing machining of multiple parts in one position.

A further shortcoming of the existing systems is the specificity of each configuration. Although the individual components are all reusable, in most cases the system needs to be completely dissembled and redesigned for each new application, often requiring a mainly new group of components. Thus time savings over conventional fixturing are not so great and a sufficient system to cover a range of applications may require many parts making it very expensive.

There is therefore a need for increased applicability of modular fixturing systems, as well as a reduction in their costs. There is also a need for modular fixturing systems which offer continuous adjustability, increased access to the workpiece and require fewer parts than the existing systems.

SUMMARY OF THE INVENTION

The object of the present invention is to provide fixturing devices usable with various fixturing components as universal modular fixturing systems which have at least one possibility of continuous adjustability, offer novel clamping possibilities and perform a wider variety of functions with relatively fewer parts.

Hence, there is provided according to the teachings of the present invention, a fixturing device for use with clamping means to clamp a workpiece, the fixturing device having a front face, a back face, a slot traversing from the back face to the front face for receiving a part of the clamping means, the front face having a groove for aligning the clamping means relative to the fixturing device.

According to a further feature of the present invention there is also provided a modular fixturing system for clamping a workpiece during machining, the workpiece having a threaded recess, the modular fixturing system comprising: (a) the above mentioned fixturing device; (b) a locating element displaceable along the groove, the locating element having a bore; and (c) a clamping bolt receivable within the bore, the clamping bolt having a head accessible through the slot, and a threaded tip for engaging the threaded recess for clamping the workpiece to the fixturing device.

According to a further feature of the present invention, the front face includes a plurality of pairs of threaded recesses for receiving bolts for clamping the locating element to the fixturing device.

According to a further feature of the present invention, the front face includes a plurality of bores for receiving positioning pins for positioning the locating element relative to the fixturing device.

According to a further feature of the present invention, the locating element includes means for retaining the clamping bolt within the bore when not in use.

According to a further feature of the present invention, the locating element includes a pair of slots for receiving bolts for clamping the locating element to the fixturing device.

According to a further feature of the present invention, there is also provided a clamping bush for clamping the locating element to the fixturing device.

According to a further feature of the present invention, the fixturing device has a shaft intersecting with the slot, the shaft receiving a displaceable clamp support for supporting a clamp.

According to a further feature of the present invention, the fixturing device has a plurality of transverse bores traversing the fixturing device and intersecting the slot, the transverse bores receiving a pin for pivotal mounting of a clamping means.

There is also provided according to the teachings of the present invention, a fixturing device for use with clamping means to clamp a workpiece, the fixturing device having a front face, a back face, a slot traversing from the back face to the front face, and a shaft intersecting with the slot, the shaft receiving a displaceable clamp support for supporting a clamp.

According to a further feature of the present invention there is also provided a modular fixturing system for supporting a clamp for clamping a workpiece, the modular fixturing system comprising: (a) the above mentioned fixturing device; (b) a clamp support for supporting the clamp, the clamp support displaceable along the shaft; and (c) securing means for securing the clamp support relative to the fixturing device.

According to a further feature of the present invention, the fixturing device has a plurality of transverse bores traversing the fixturing device and intersecting the slot and the shaft, the transverse bores receiving a pin for pivotal mounting of a clamping means.

According to a further feature of the present invention, the fixturing device has a plurality of threaded recesses for attaching a fixturing component.

According to a further feature of the present invention, the fixturing device has a plurality of accurately positioned bores for locating a fixturing component.

There is also provided according to the teachings of the present invention, a modular fixturing system for clamping a workpiece during machining, the modular fixturing system comprising: (a) a fixturing device having a plurality of transverse bores; (b) a first pin locatable in one of the transverse bores; (c) first clamping means assuming an inoperative position and an operative position for clamping the workpiece, the first clamping means pivotally mountable on the first pin; and (d) actuating means for effecting an angular displacement of the first clamping means about the first pin so as to dispose the first clamping means from the inoperative position to the operative position.

According to a further feature of the present invention, the first clamping means has a plurality of pivot positions for receiving the first pin.

According to a further feature of the present invention, the first clamping means includes a closing jaw, the angular displacement producing a linear displacement of the closing jaw along the fixturing device.

According to a further feature of the present invention, there is also provided: (a) a second pin locatable in one of the transverse bores; and (b) a second clamping means pivotally mounted on the second pin, wherein the actuating means effects an angular displacement of the second clamping means opposing the angular displacement of the first clamping means.

According to a further feature of the present invention, the first clamping means has a threaded bore, and wherein the actuating means includes a bolt adjustably receivable within the threaded bore.

There is also provided according to the teachings of the present invention, a fixturing device for use with clamping means to clamp a workpiece, the fixturing device having a front face, a back face, a slot traversing from the back face to the front face, and a plurality of transverse bores traversing the fixturing device and intersecting the slot, the transverse bores receiving a pin for pivotal mounting of a clamping means within the slot.

According to a farther feature of the present invention, the front face has a plurality of threaded recesses for attaching a fixturing component.

According to a further feature of the present invention, the front face has a plurality of accurately positioned bores for locating a fixturing component.

BRIEF DESCRIPTION OF THE DRAWINGS

The invention is herein described, by way of example only, with reference to the accompanying drawings, wherein:

FIG. 1B is a side view of the fixturing device of FIG. 1A;

FIG. 1C is a front view of the fixturing device of FIG. 1A;

FIG. 1D is a top partial cross-section of the fixturing device of FIG. 1A;

DESCRIPTION OF THE PREFERRED EMBODIMENTS

Figure 1A:
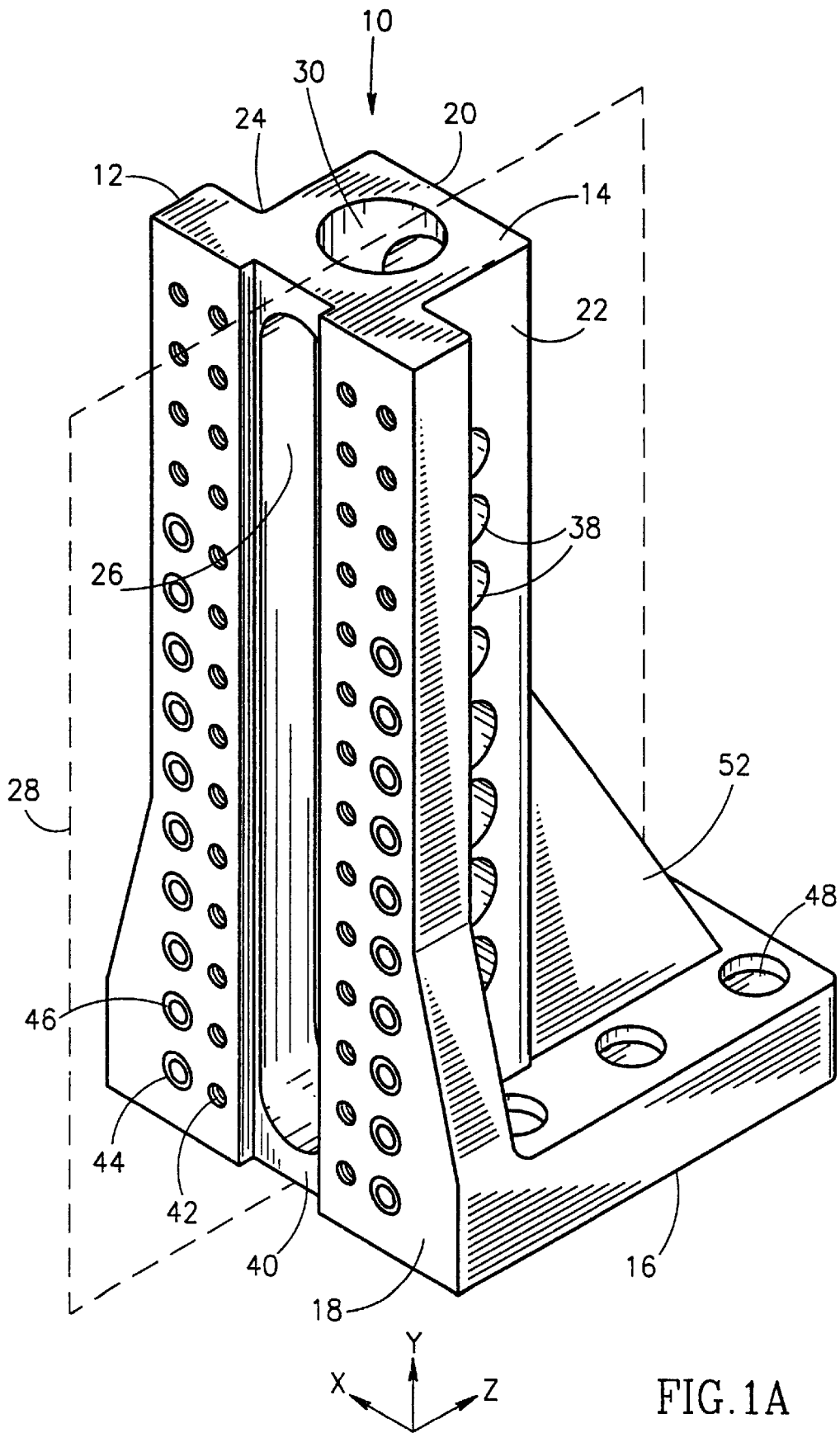
FIG. 1A is a perspective view of a first embodiment of a fixturing device for use as part of a universal modular fixturing system, constructed and operative according to the teachings of the present invention.

The present invention is of fixturing devices usable with various fixturing components as universal modular fixturing systems.

The principles of fixturing devices, and their associated universal modular fixturing systems, according to the present invention may be better understood with reference to the drawings and the accompanying description.

Referring now to the drawings, FIGS. 1A, 1B, 1C and 1D show a preferred embodiment of a fixturing device, generally designated 10, constructed and operative according to the teachings of the present invention. Fixturing device 10 has a clamping plate 12 integrally formed with a support column 14 and a base 16. Clamping plate 12 has a front face 18 and support column 14 has a back face 20, a first side face 22 and a second side face 24. Typically, the overall height of fixturing device 10 is between 150 mm. and 500 mm. Support column 14 is typically 50–120 mm. wide and 40–100 mm. from front face 18 to back face 20.

For convenience, certain features of fixturing device 10 will be described with reference to rectangular axes, x, y and z, arbitrarily chosen such that the x-axis is perpendicular to the long dimension of front face 18, the y-axis is parallel to the long dimension of front face 18, and the z-axis is perpendicular to front face 18.

A slot 26 traverses fixturing device 10 from front face 18 to back face 20, parallel to the z-axis. Slot 26 is elongated parallel to the y-axis, extending along the greater part of front face 18. Slot 26 has a plane of symmetry 28 through the center of slot 26, parallel to the y- and z-axes. Along the x-axis, slot 26 is central to front face 18. The dimension of slot 26 parallel to the x-axis, hereinbelow described as its width, is typically in the range of 15–35 mm.

Figure 2:
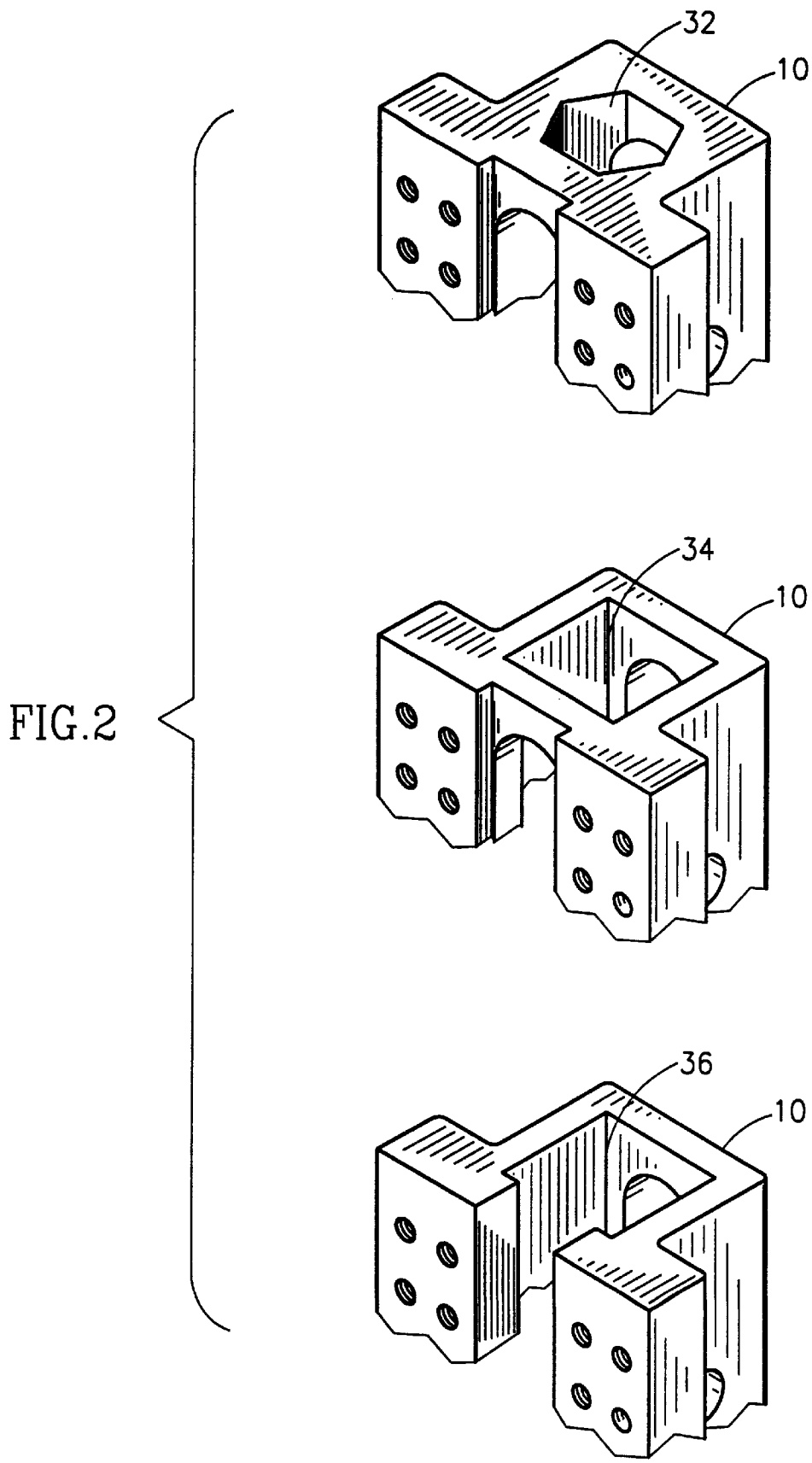
FIG. 2 is a partial perspective view of three fixturing devices, illustrating alternative designs of shaft, the fixturing devices being constructed and operative according to the teachings of the present invention.

Support column 14 has a shaft 30 extending parallel to the y-axis. Shaft 30 intersects slot 26, together defining a continuous void. Shaft 30 also has a central plane of symmetry parallel to the y- and z-axes, this plane coinciding with plane of symmetry 28. The width of shaft 30 parallel to the x-axis is greater than the width of slot 26, so that a slidable element received by shaft 30 is retained therein. Preferably, shaft 30 is cylindrical, this shape being the easiest and cheapest to produce. A range of other designs are however functionally equivalent. FIG. 2 shows examples of some alternative designs, in which fixturing device 10 has a hexagonal shaft 32, a rectangular shaft 34, and an open T-slot 36.

A plurality of transverse bores 38 traverse support column 14 from face 22 to face 24, intersecting slot 26 and shaft 30. Transverse bores 38 are parallel to the x-axis. Transverse bores 38 are spaced along support column 14 parallel to the y-axis, typically at a pitch of 25–40 mm.

Front face 18 has a locating groove 40 extending parallel to the y-axis. The preferred form of locating groove 40 is a shallow rectangular channel slightly wider than slot 26, centered on and symmetrical about plane of symmetry 28. Locating groove 40 enables precise positioning of certain clamping components, as will be described below. The same function can be achieved without locating groove 40 if the entirety of slot 26 is machined to a very high precision, but this is difficult and highly costly to achieve. Instead it is preferable to leave slot 26 at relatively low precision and to provide a separate shallow precision slot which is much cheaper and easier to produce. Alternative designs for locating groove 40 include one or more narrow grooves of rectangular or V-shaped cross-section along the front face of support column 14, parallel to slot 26.

Front face 18 also has two types of holes arranged in four columns parallel to the y-axis. The inner columns of holes are realized as pairs of threaded recesses 42 and the outer columns are realized as pairs of accurately positioned locating bores 44. Several pairs of threaded recesses 42 are provided at the top of the outer columns, these being necessary for certain applications which will be described below. Locating bores 44 are provided with hardened, precision sleeve elements 46, as is known in the art. Alternatively, and preferably, the whole of fixturing device 10 may be hardened, thereby providing locating bores 44 and other features of fixturing device 10 with a high degree of precision and durability. The pitch of threaded recesses 42 and locating bores 44 is typically between 15 mm. and 25 mm. Additional rows of holes of various types may be provided. In particular, additional threaded recesses of small diameter, staggered between threaded recesses 42 and locating bores 44, allow attachment of small or thin clamping components.

FIG. 1D shows clearly a preferred design of base 16 in which it extends outward from the back and both sides of support column 14, thereby providing maximum rigidity and stability to fixturing device 10 without obstructing access to front face 18. Many other designs are also effective, including for example an inverted T-shaped structure with base 16 extending from the sides of support column 14 and an L-shaped structure with base 16 extending from the back of support column 14. A design wherein base 16 extends from the front of support column 14 also falls within the scope of the current invention, although it is generally less desirable.

Base 16 has a plurality of bolting holes 48. It also has two mounting holes 50 and reinforcing fins 52. Base 16 is designed to be fixable to a machining table or to a platter of either of the conventional modular fixturing systems. Bolting holes 48 are preferably at a separation matching that of conventional modular systems using a matrix of accurately positioned holes. For fastening to a platter of a slotted grid type system a conventional adapter plate is used. Alternatively, base 16 may be adapted for any other conventional method of attachment. For example, base 16 may be clamped to a surface with conventional G-clamps or the like, or adapted for direct attachment to a platter of a slotted grid type system. Reinforcing fins 52 give fixturing device 10 extra rigidity, but are not essential.

Fixturing device 10 is usable with various fixturing components as a modular fixturing system. This modular fixturing system enables the construction of universal fixtures, each of which provides a particular clamping technique and is adjustable for workpieces of a wide range of sizes.

Fixturing device 10 can be employed to clamp a workpiece according to three techniques. The first clamping technique, herein below referred to as back-clamping, will be described with reference to FIGS. 3 to 7. The second clamping technique, herein below referred to as relocatable clamping, will be described with reference to FIGS. 8 to 10. The third technique, herein below referred to as lever-arm clamping, will be described with reference to FIGS. 11 to 17.

With reference now to FIGS. 3 to 7, the back-clamping technique will be described, together with other closely related clamping techniques. In back-clamping, a clamping bolt engaged in a threaded recess in the workpiece is tightened thereby clamping the workpiece. It is a particularly important technique, providing simultaneous access to as many as five sides of the workpiece. This enables very efficient use of modern numerical control machining systems of all types.

Figure 3:
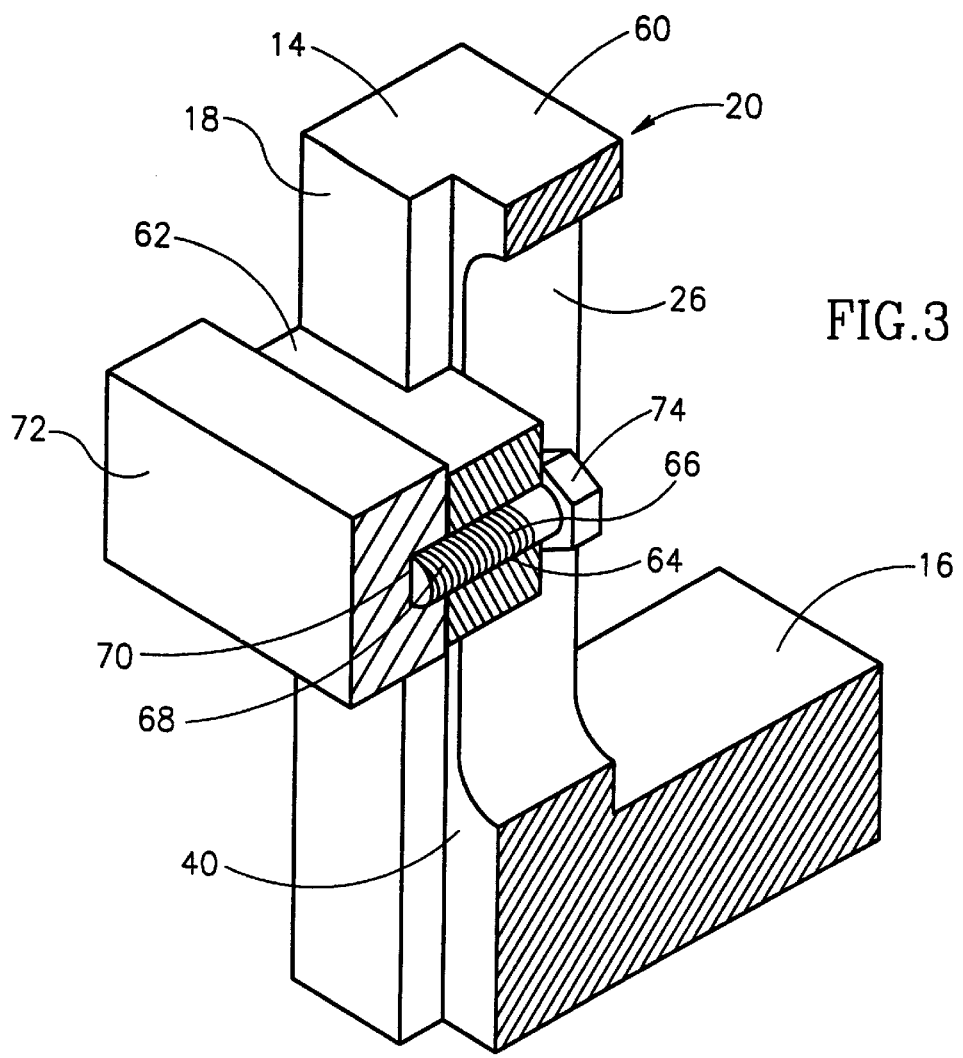
FIG. 3 is a schematic representation of an implementation of the back-clamping technique, using a locating element, the implementation being constructed and operative according to the teachings of the present invention.

FIG. 3 shows an implementation of this technique, constructed and operative according to the teachings of the present invention. For the sake of clarity, some of the features of fixturing device 10, now designated 60, which are not essential to this technique have been omitted. Hence, the major features of fixturing device 60 (shown cut-away along plane of symmetry 28 of FIG. 1A) include support column 14 (here including clamping plate 12), base 16, front face 18, back face 20, slot 26, and locating groove 40. In some cases of this implementation, threaded recesses 42 and locating bores 44 are also used.

A locating element 62 is fixed to front face 18 in a manner described below. Locating element 62 has a barrel 64 which receives a clamping bolt 66. Clamping bolt 66 has a threaded tip 68 for engaging a threaded recess 70 in a workpiece 72. When the head 74 of clamping bolt 66 is turned, workpiece 72 is closed tightly against the front of locating element 62, so that workpiece 72 is clamped in a required position. To make full use of the advantages of this clamping technique, the workpiece must be mounted in a very specific position and orientation relative to fixturing device 60 and thereby also relative to the machining system as a whole. This is the function of locating element 62 which provide a precise position for the stem of clamping bolt 66 relative to the features of front face 18.

With reference now to FIGS. 4A, 4B, 4C and 4D, the features of locating element 62 will be described in more detail. A pair of locating elements 62 are generally used together to fix the orientation of the workpiece. FIGS. 4A, 4B, 4C and 4D show a preferred design for a pair of locating elements 62, here designated 76 and 78. In addition to the features already mentioned, locating elements 76 and 78 each have a clamping surface 80, 82, against which the workpiece is held, and a protrusion 84 to cooperate with locating groove 40. Clamping bolt 66 is retained within barrel 64 by a retaining element 86 cooperating with a recessed cincture 88 of clamping bolt 66. Retaining element 86 is engaged in a lateral hole 90 in barrel 64.

Figure 4A:
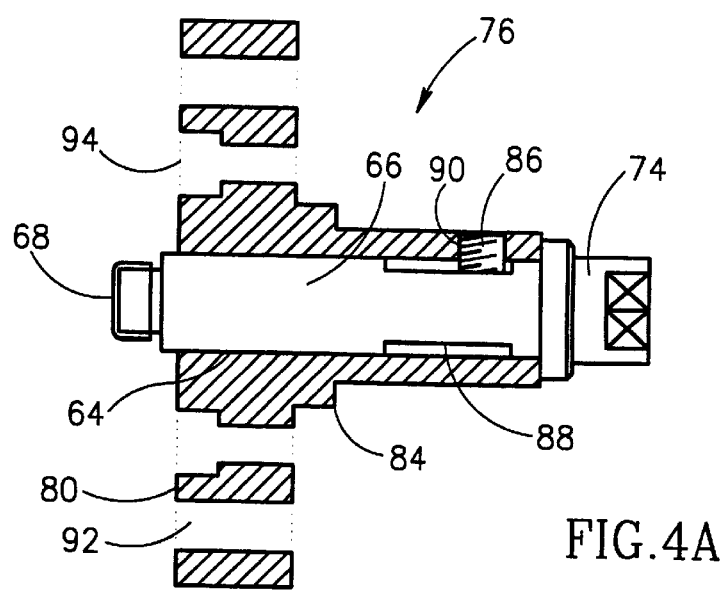
FIG. 4A is a cross-section through a first locating element, for use in the implementation of FIG. 3.
Figure 4B:
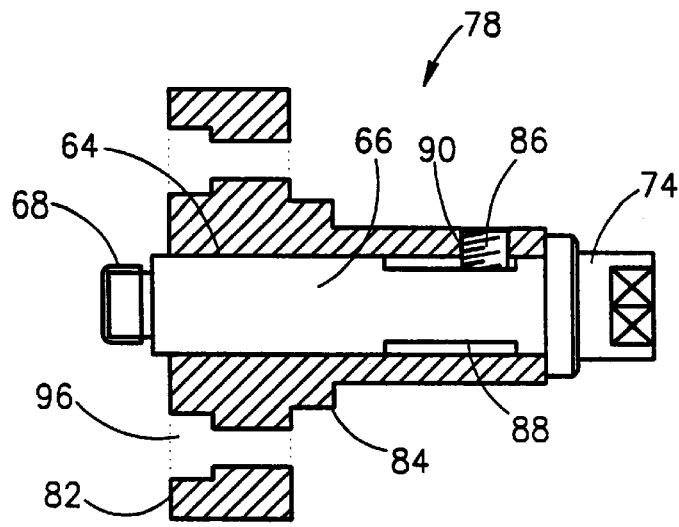
FIG. 4B is a cross-section through a second locating element, for use in the implementation of FIG. 3.
Figure 4C:
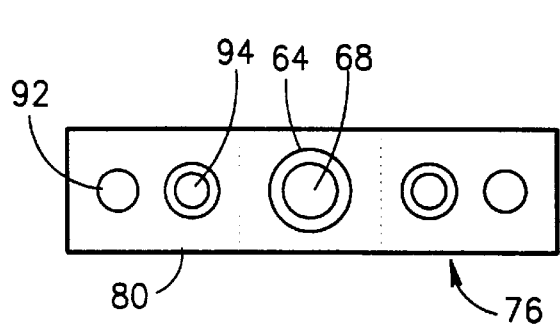
FIG. 4C is a front view of the locating element of FIG. 4A.
Figure 4D:
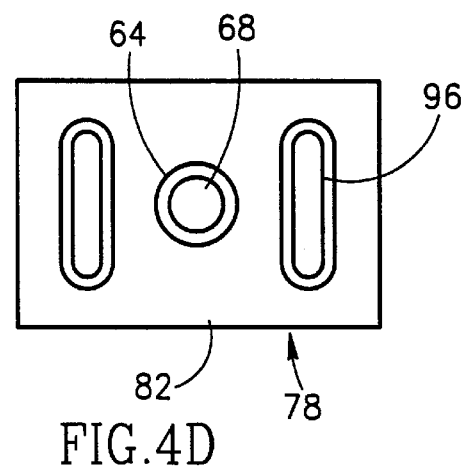
FIG. 4D is a front view of the locating element of FIG. 4B.

Locating element 76 is distinguished from locating element 78 in that clamping surface 80 of locating element 76 has precision holes 92 for locating pins as well as countersunk bolting holes 94. Locating element 78 has two countersunk bolting slots 96 in its elongated clamping surface 82, as is seen in FIG. 4D.

Figure 5A:
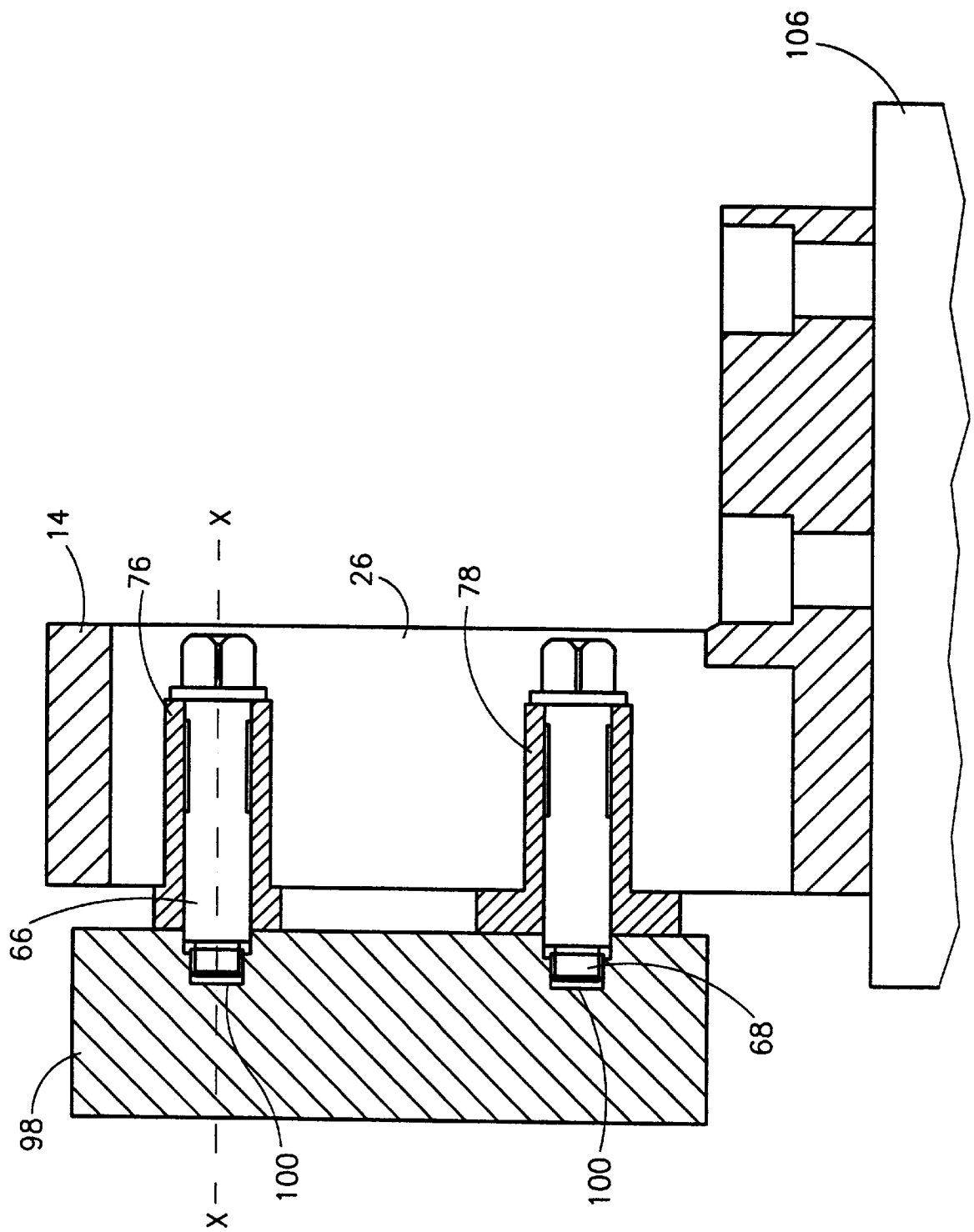
FIG. 5A is a cross-sectional side view of a fixture illustrating the use of the locating elements of FIGS. 4A and 4B.
Figure 5B:
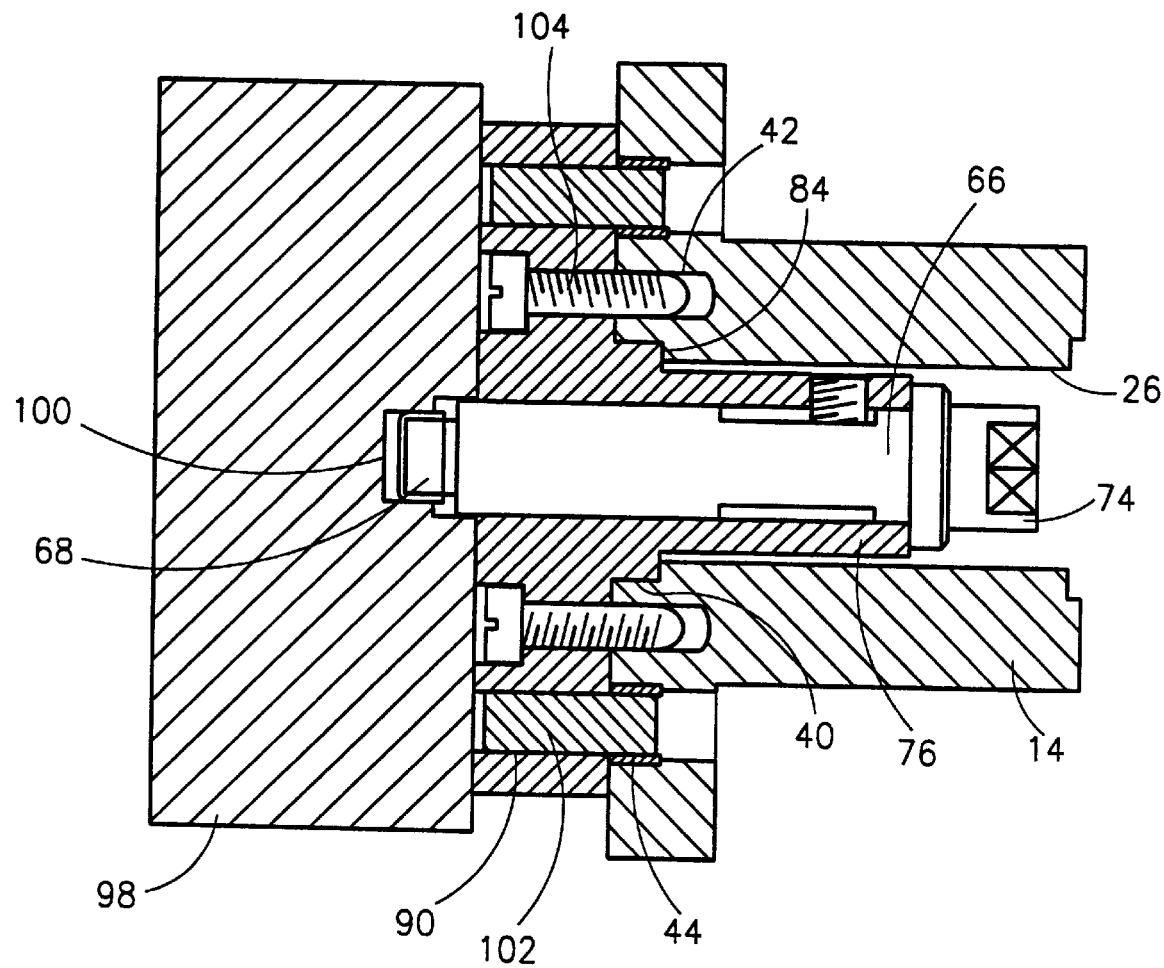
FIG. 5B is a cross-sectional top view along the line X—X of FIG. 5A.

FIGS. 5A and 5B illustrate an implementation of the back-clamping technique, constructed and operative according to the teachings of the present invention, in which fixturing device 60 is used with locating elements 76, 78 to clamp a workpiece 98. Threaded recesses 100 in workpiece 98 are gripped by clamping bolts 66 which are tightened through slot 26 from the back of support column 14.

The position and orientation of workpiece 98 clamped in this way is precisely defined, as will be appreciated with particular reference to FIG. 5B. Protrusion 84 cooperates slidingly with locating groove 40, defining the lateral position of locating elements 76, 78 relative to clamping plate 12. Locating element 76 is positioned using two locating pins 102 which maintain alignment between precision holes 92 and two of locating bores 44, defining the position of locating element 76 along clamping plate 12. Locating element 76 is secured by two bolts 104 thereby fixing it against clamping plate 12.

Locating element 78 is secured to clamping plate 12 by a further two bolts (not shown) at a distance from locating element 76 corresponding to the separation between threaded recesses 100. The length of bolting slots 96 preferably corresponds to the separation between rows of threaded recesses 42 so that, in any given position, bolting slots 96 will each overlap at least one threaded recess 42. This enables locating element 78 to be secured wherever required in a continuous range of positions along clamping plate 12, thereby allowing clamping of workpieces 98 with threaded recesses 100 separated differently.

The combination of a first threaded recess 100 being precisely located in three dimensions and a second having a known orientation to the first defines the position and orientation of the workpiece. Since fixturing device 60 is mounted on a machining table or platter 106 in a precise position by use of bolting holes 48 or another known method, the position and orientation of workpiece 98 relative to machining table or platter 106 is precisely defined.

Figure 4E:
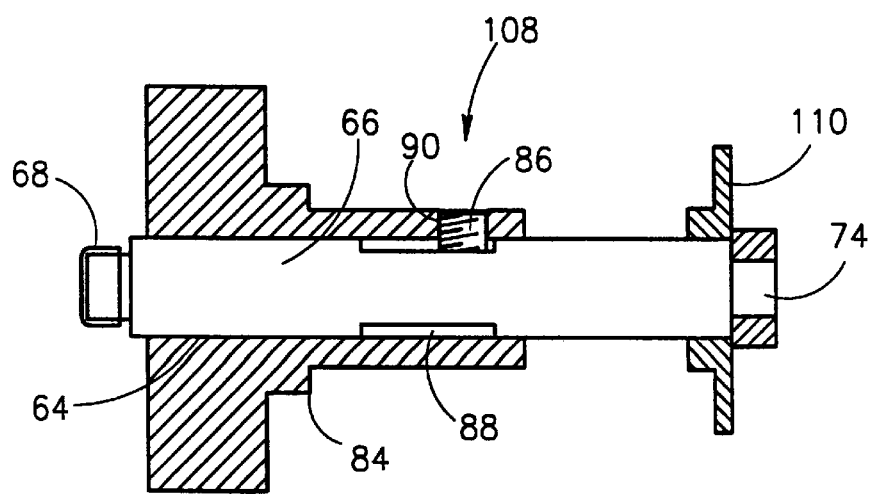
FIG. 4E is a cross-section through an alternative locating element, for use in the implementation of FIG. 3.

Referring now to FIG. 4E, there is shown an alternative design for a locating element 62, generally designated 108, which may replace locating elements 76, 78. Locating element 108 is similar to locating element 76, and equivalent features are labelled similarly. Clamping bolt 66 of locating element 108 is elongated to extend beyond the back of slot 26 where head 74 cooperates with a locking element 110. Locking element 110 is preferably wide and thin so that locating element 108 may be removed from fixturing device 60 by rotating it through 90 degrees and drawing it through slot 26.

In use, when clamping bolt 66 is turned to clamp a workpiece, locking element 110 is forced against the back of support column 14 on both sides of slot 26 thereby also securing locating element 108 in position.

Locating element 108 may be used with an embodiment of the invention in which fixturing device 60 does not have threaded recesses 42 or locating bores 44, with a loss of vertical precision. Alternatively, one locating element 108 may be provided with precision holes (not shown) for use with a fixturing device having locating bores 44.

In some cases, it is advantageous to use locating elements 76, 78 or 108 to mount clamping elements of certain types.

Figure 6A:
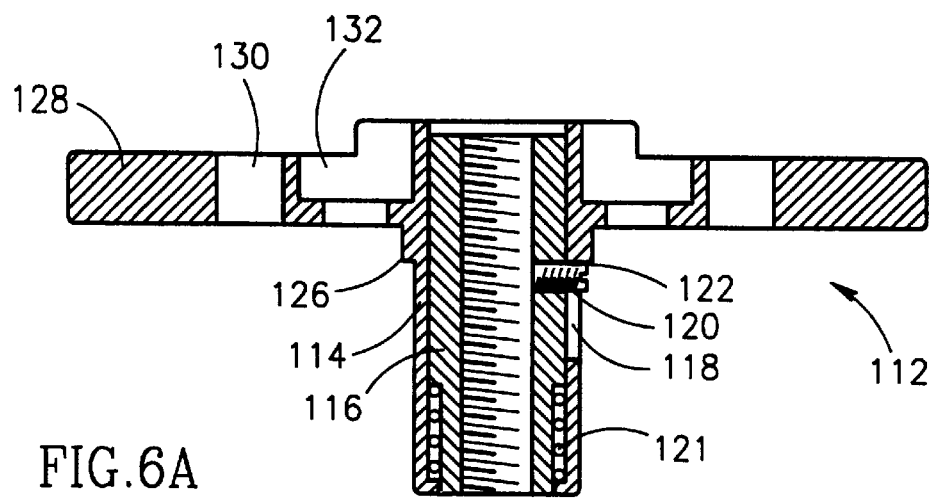
FIG. 6A is a cross-section through a round adaptor plate, for use with an expanding mandrel, the round adaptor plate being constructed and operative according to the teachings of the present invention.
Figure 6B:
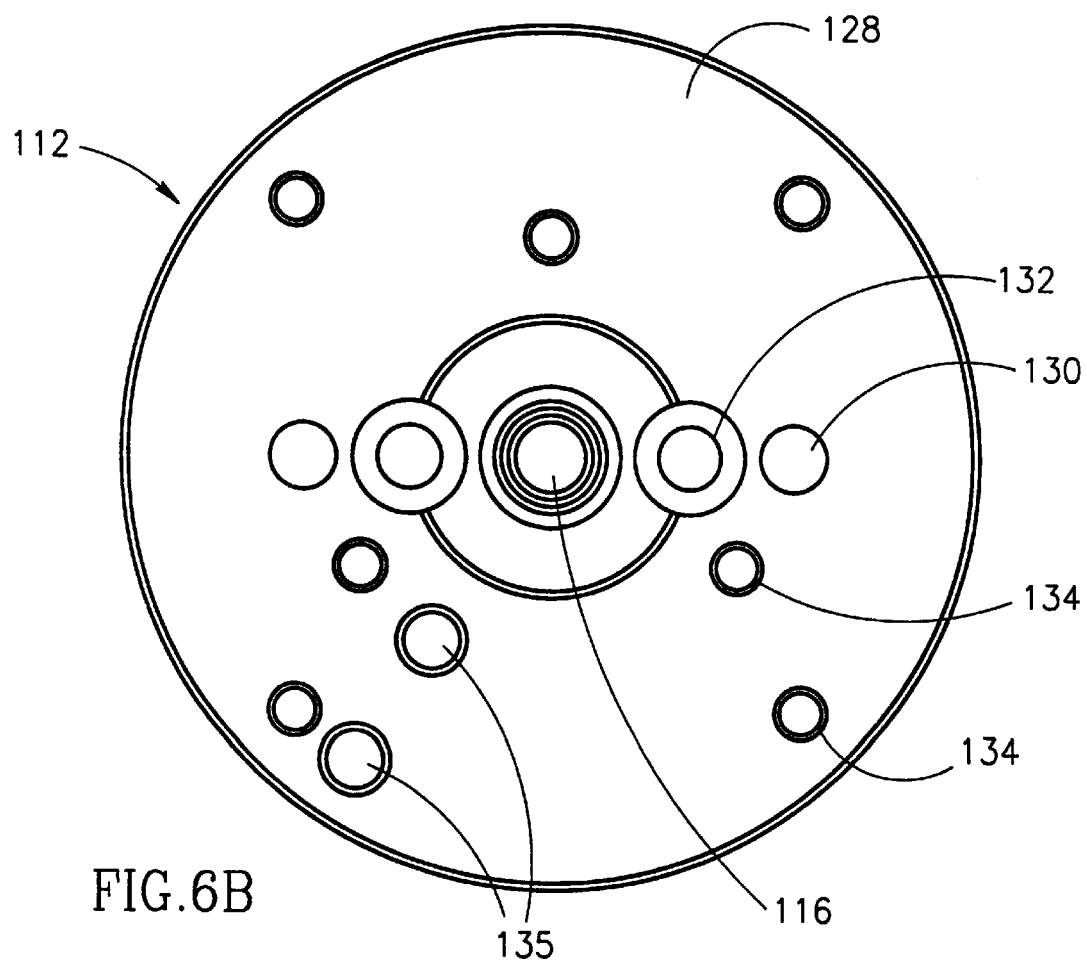
FIG. 6B is a front view of the round adaptor plate of FIG. 6A.

FIGS. 6A and 6B show an adaptor plate, generally designated 112, which is used in place of locating element 62 with expanding mandrels or the like. Adaptor plate 112 has a barrel 114 which houses a hollow, internally threaded, slidable cylinder 116. Barrel 114 has a retainer slot 118 along part of its length. A retaining element 120, engaged in a lateral hole 122 of slidable cylinder 116, is moveable within retainer slot 118. Slidable cylinder 116 is thus retained within barrel 114 and prevented from rotating. Slidable cylinder 116 is urged by a spring 124 to an engagement position.

Adaptor plate 112 also provides a protrusion 126 to cooperate with locating groove 40, and a clamping surface 128 against which the workpiece is held.

FIG. 6B shows clamping surface 128, which has precision holes 130 for locating pins as well as countersunk bolting holes 132. Clamping surface 128 additionally provides a number of threaded recesses 134 and locating bores 135. These features enable adaptor plate 112 to be used with a range of different accessories. In particular, they are suited to novel designs of universal sleeve-clamps as described in the co-pending patent application entitled Universal Modular Sleeve-Clamp Systems, filed on the same day as this application.

Figure 7A:
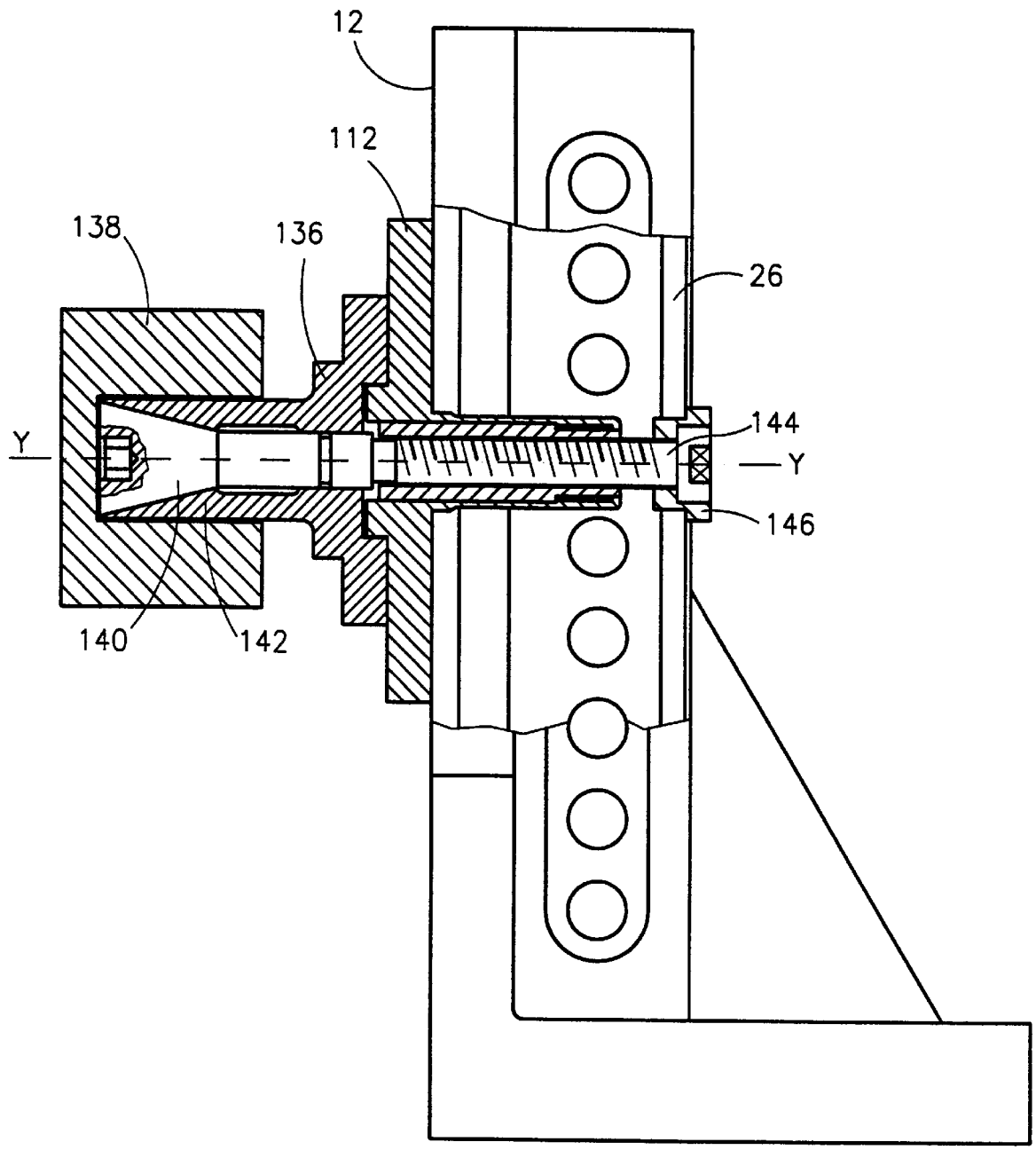
FIG. 7A is a cross-sectional side view of a fixture illustrating the use of the round adaptor plate of FIG. 6A.
Figure 7B:
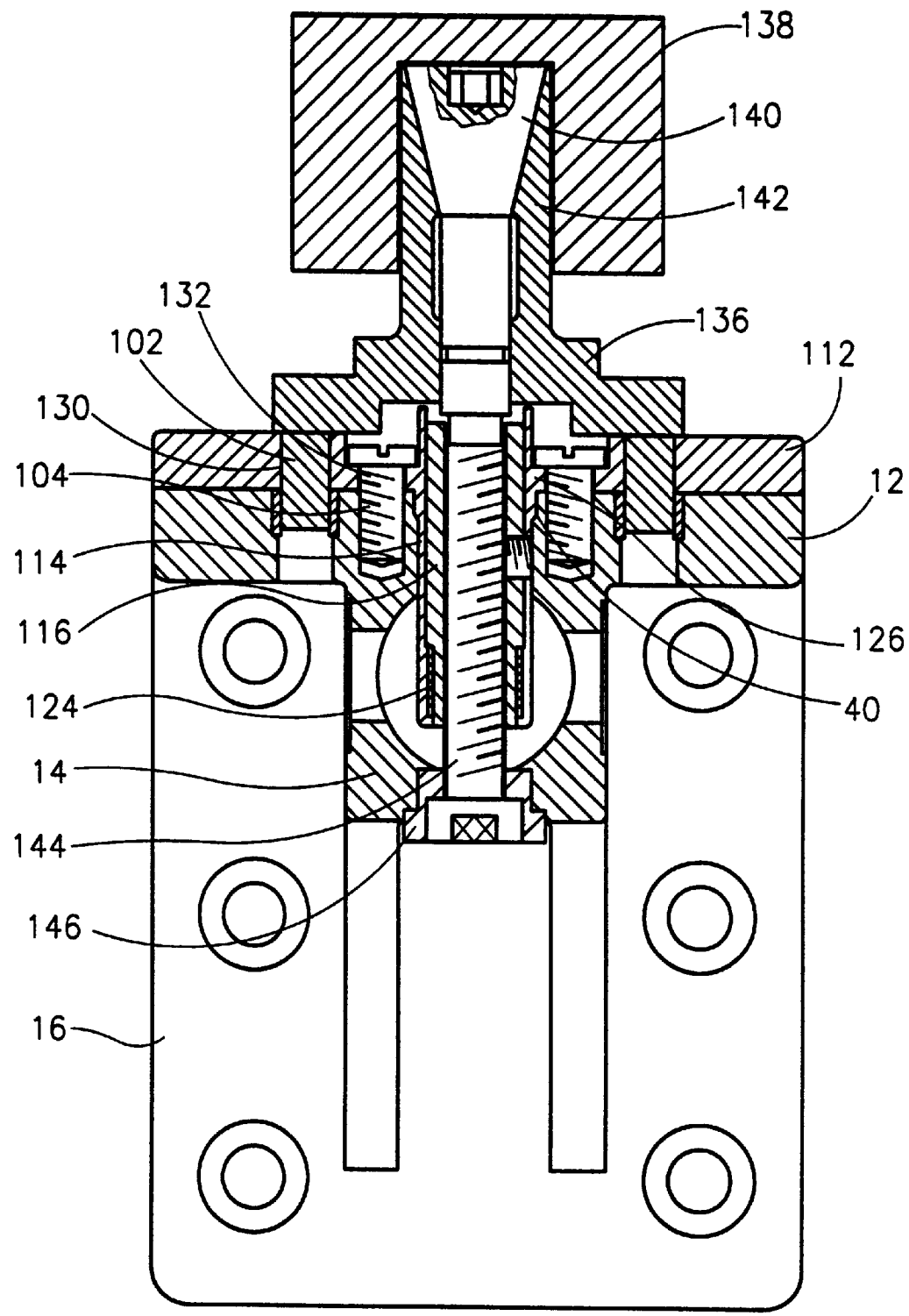
FIG. 7B is a cross-sectional top view along the line Y—Y of FIG. 7A.

FIGS. 7A and 7B show an application in which adaptor plate 112 is used with an expanding mandrel 136 to clamp the internal diameter of a workpiece 138. Expanding mandrel 136 includes a draw-bolt 140 and a sleeve 142. A tightening bolt 144 is engaged in slidable cylinder 116, and cooperates with a tightening block 146 at the back of slot 26. Adaptor plate 112 is fixed in position by two locating pins 102 and two bolts 104 (visible in FIG. 7B).

In use, adaptor plate 112 is first positioned precisely on clamping plate 12 as was described for locating element 76. Expanding mandrel 136 is then attached using threaded recesses 134 to clamping surface 128, with draw-bolt 140 engaged in the front of slidable cylinder 116. When tightening bolt 144 is engaged and tightened, slidable cylinder 116 together with draw-bolt 140 is drawn against spring 124, thereby expanding sleeve 142 to clamp workpiece 138.

Figure 8:
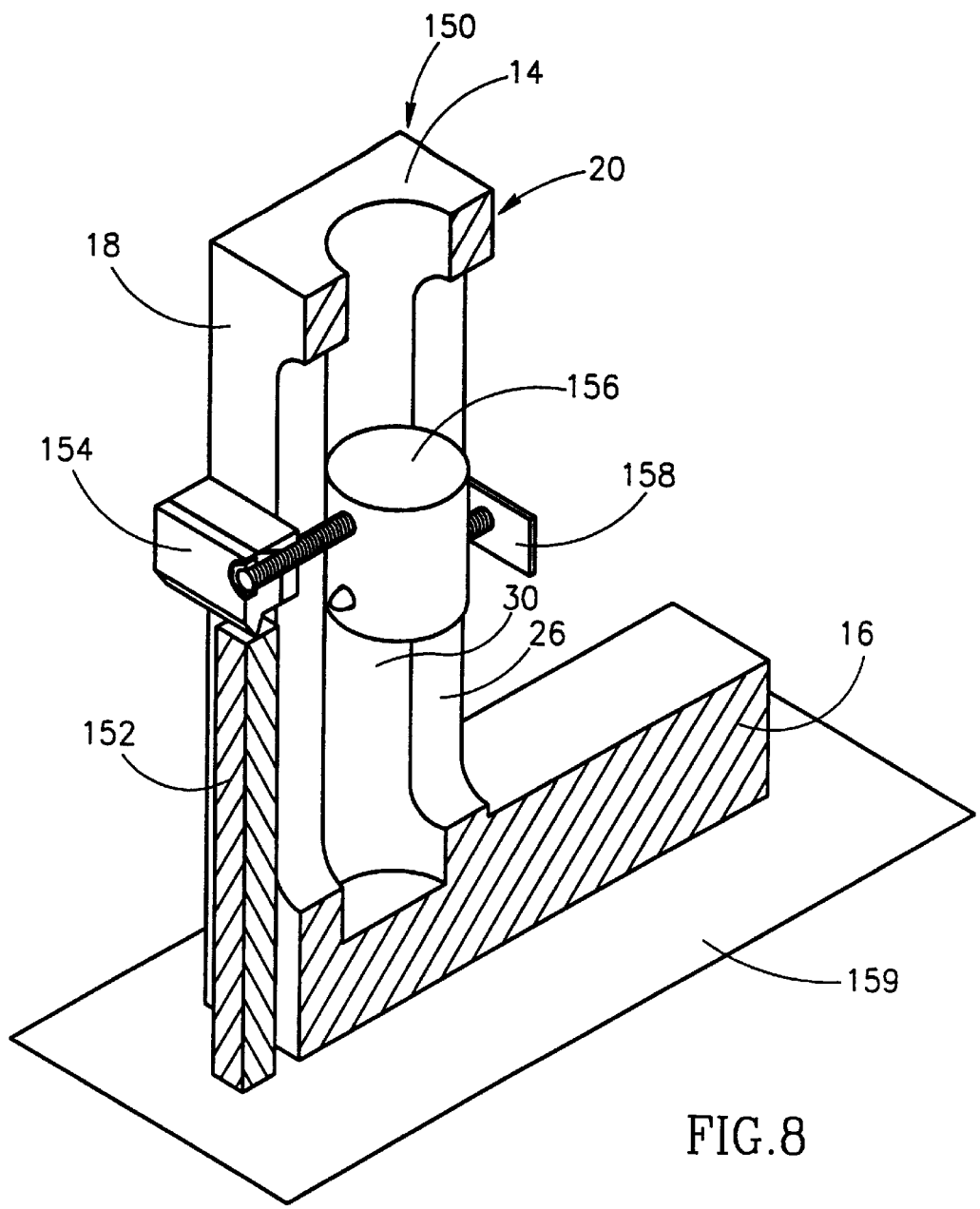
FIG. 8 is a schematic representation of an implementation of the relocatable clamping technique, using a relocatable clamp support, the implementation being constructed and operative according to the teachings of the present invention.
Figure 9A:
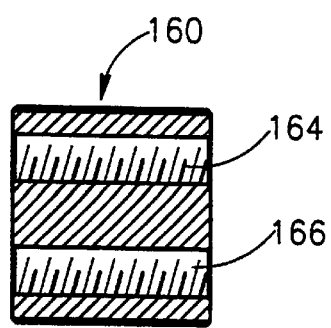
FIG. 9A is a cross-section through a first relocatable clamp support, for use in the implementation of FIG. 8.
Figure 9B:
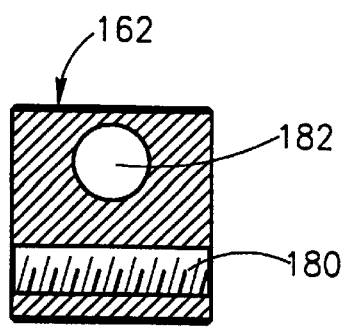
FIG. 9B is a cross-section through an alternative relocatable clamp support, for use in the implementation of FIG. 8.
Figure 10:
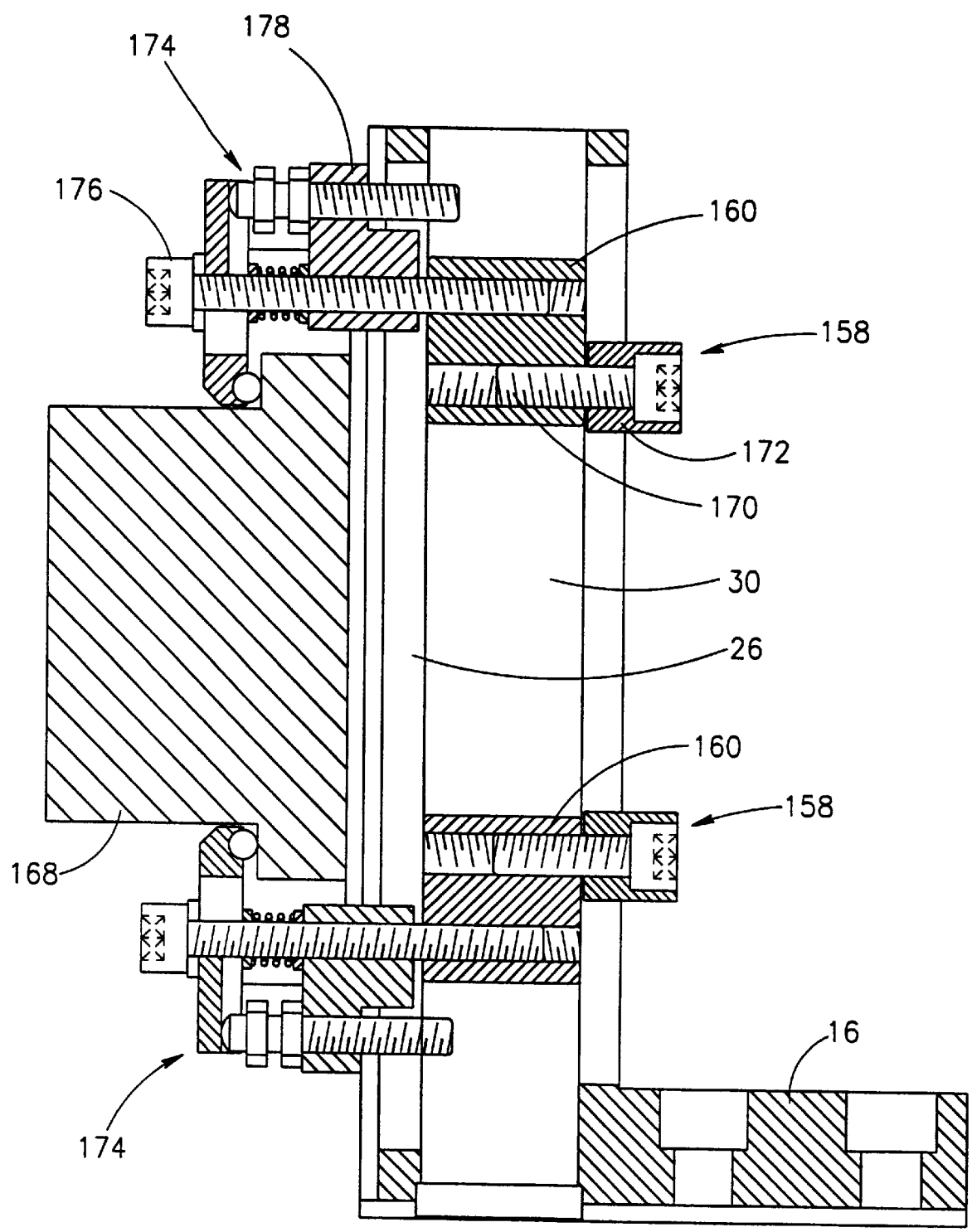
FIG. 10 is a cross-sectional side view of a fixture illustrating the use of the relocatable clamp support of FIG. 9A.

With reference now to FIGS. 8 to 10, the relocatable clamping technique will be described. FIG. 8 shows an implementation of this technique, constructed and operative according to the teachings of the present invention. For the sake of clarity, some of the features of fixturing device 10, now designated 150, which are not essential to this technique have been omitted. Hence, the major features of fixturing device 150 (shown cut-away along plane of symmetry 28 of FIG. 1A) include support column 14 (here including clamping plate 12), base 16, front face 18, back face 20, slot 26, and shaft 30.

In this implementation, a workpiece 152 is held by a clamp 154 which is mounted on a relocatable clamp support 156. Relocatable clamp support 156 is displaceable along shaft 30 and may be secured in the required position by a locking element 158 which tightens against back face 20. In this case, workpiece 152 is clamped against machining table or platter 159.

With reference now to FIGS. 9A and 9B, the features of relocatable clamp support 156 will be described in more detail. FIGS. 9A and 9B show a two preferred designs for relocatable clamp support 156, here designated 160 and 162. FIG. 9A shows relocatable clamp support 160 which has a socket 164 for the mounting of a clamping element, and a securing bore 166 parallel to the length of socket 164.

Relocatable clamp support 160 has a circular cross-section to match the cylindrical design of shaft 30. If the alternative designs of FIG. 2 are employed, relocatable clamp support 160 is shaped accordingly.

Socket 164, in this case, is a threaded bore, to which an unlimited variety of clamping elements may be fastened using a bolt. Any other conventional design of socket for receiving a range of attachments may be substituted. Securing bore 166, in this case, is also a threaded bore the use of which will be described below.

FIG. 10 illustrates an application in which fixturing device 150 is used with two relocatable clamp supports 160 to clamp a workpiece 168. Relocatable clamp supports 160 are each secured by locking element 158 which includes a bolt 170 mounted in a clamping bush 172. Clamps 174 are attached by and, in this example, also operated by additional bolts 176. Clamps 174 have mounting blocks 178 shaped to fit clamping plate 12, but are otherwise of a conventional design.

Relocatable clamp supports 160 can be inverted or, in the case that socket 164 and securing bore 166 are interchangeable, their uses can be reversed without inversion. This enables socket 164 to be positioned over substantially the entire length of shaft 30.

FIG. 9B shows an alternative relocatable clamp support 162, in which socket 180 for the mounting of a clamping element is perpendicular to securing bore 182. Relocatable clamp support 162 is used with a fixturing device 150 having additional transverse bores 38, and is secured by a pin (described below with reference to FIG. 12B) located within transverse bores 38 and securing bore 182.

This alternative design is particularly suited to high-stress applications, although relocatable clamp support 162 can only be used at the specific positions of transverse bores 38. In many applications in which two clamps are required, it is preferable to use a combination of one relocatable clamp support 162, which provides a defined position and extra strength, together with one relocatable clamp support 160, which allows a continuous range of adjustment between the clamps to fit any workpiece.

Figure 11:
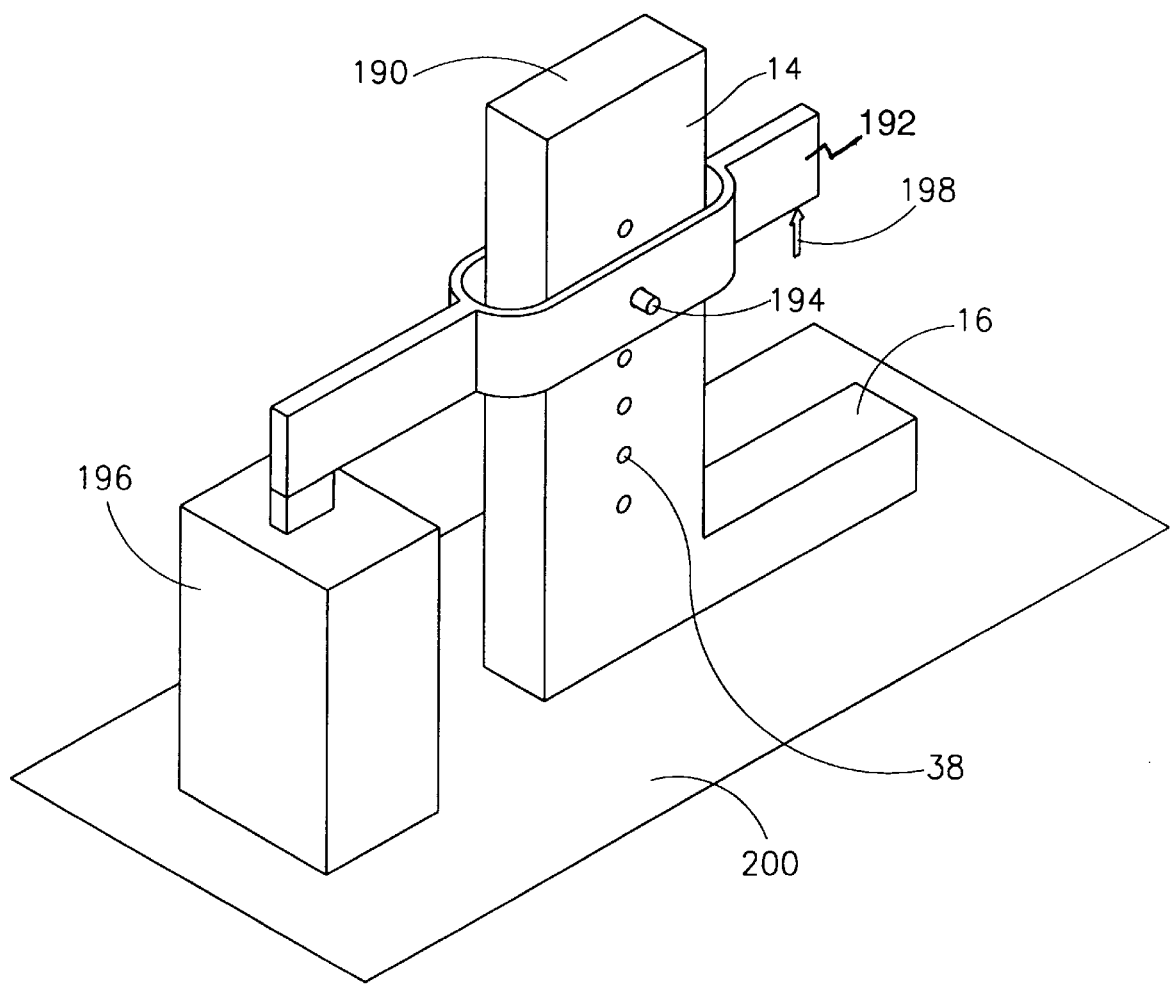
FIG. 11 is a schematic representation of an implementation of the lever-arm clamping technique, using a lever arm, the implementation being constructed and operative according to the teachings of the present invention.

With reference now to FIGS. 11 to 17, the lever-arm clamping technique will be described. FIG. 11 shows an implementation of this technique, constructed and operative according to the teachings of the present invention. For the sake of clarity, some of the features of fixturing device 10, now designated 190, which are not essential to this technique have been omitted. Hence, the major features of fixturing device 190 include support column 14 (here including clamping plate 12), base 16 and transverse bores 38.

A lever arm 192 is mounted on a pin 194 which may be located in any of transverse bores 38. Lever arm 192 is rotated from an inoperative position to an operative position for clamping a workpiece 196 by an actuator represented by arrow 198. In this example, workpiece 196 is clamped against machining table 200. In a preferred embodiment (not shown) equivalent to this structure (FIG. 11), fixturing device 190 has a slot corresponding to slot 26 shown in FIG. 1A, and lever arm 192 is mounted on pin 194 within slot 26.

It is a preferred feature of this clamping technique that the clamping action of lever arm 192 is effective over a range of positions similar to the pitch of transverse bores 38, such that lever arm 192 can provide a clamping action at a substantially continuous range of positions along clamping plate 12.

Figure 12A:
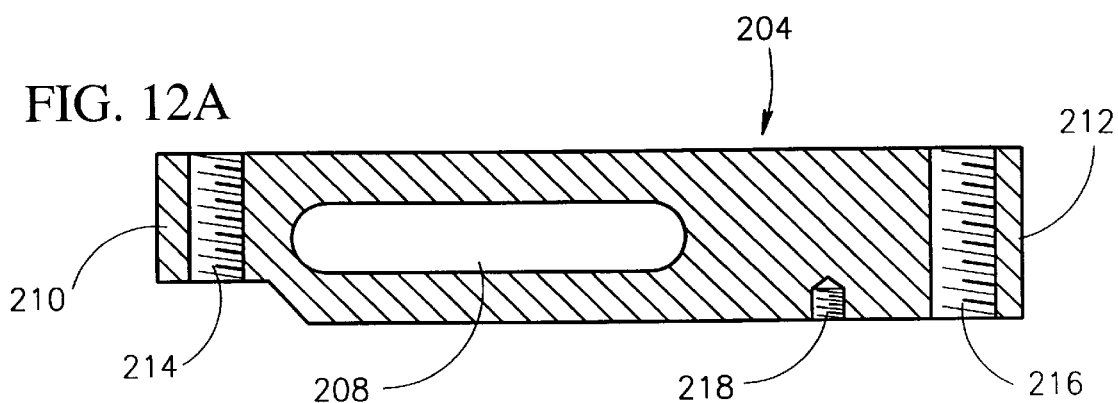
FIGS. 12A and 12B are side views in partial cross-section of two lever arms for use in the implementation of FIG. 11.
Figure 12B:
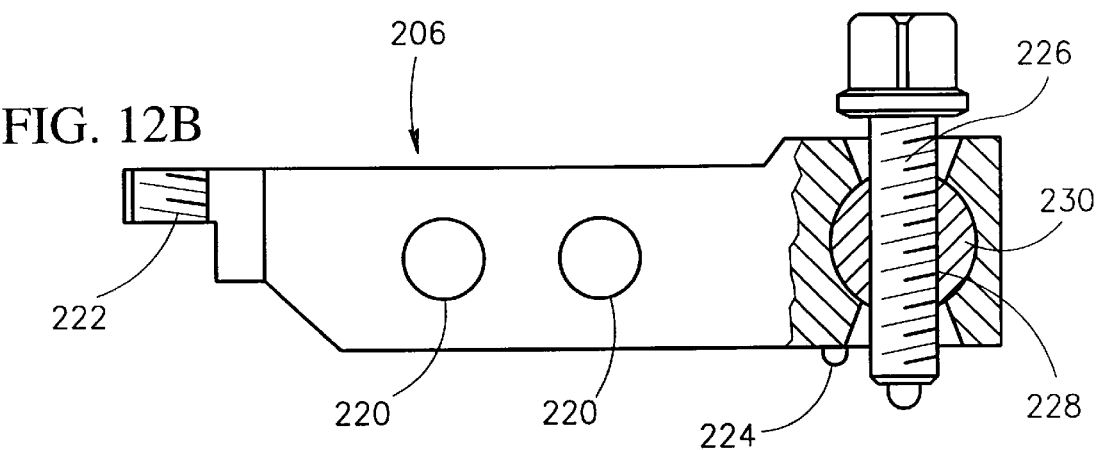

With reference now to FIGS. 12A–12D, the features of lever arm 192 and pin 194 will be described in more detail. FIGS. 12A and 12B show two preferred designs for lever arm 192, here designated 204 and 206, to be mounted within slot 26 of fixturing device 190. Lever arm 204 has a pivot slot 208, a clamping part 210 and an adjustment part 212. Clamping part 210 is provided with a clamp-mount 214 for receiving different clamping jaws. Adjustment part 212 has a threaded hole 216 to receive an adjuster bolt, and a socket 218 for attaching a return spring.

Lever arm 206 has two pivot holes 220, a clamp-mount 222 and a loop 224 for attaching a return spring. An adjuster bolt 226 is located in a threaded hole 228 through a rotatable cylinder 230.

Figure 12C:
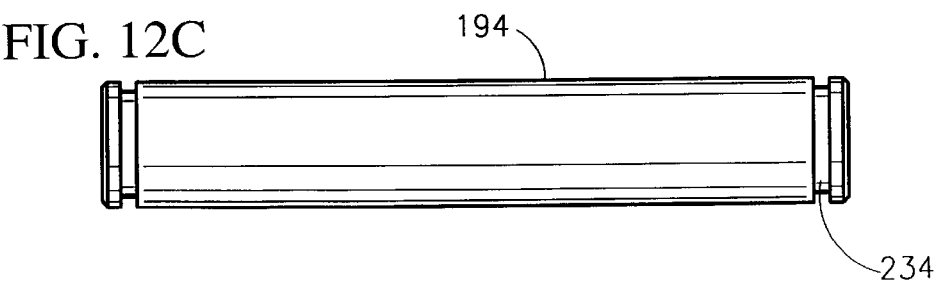
FIGS. 12C and 12D are side views of a pin and retaining grommet for use in the implementation of FIG. 11.
Figure 12D:
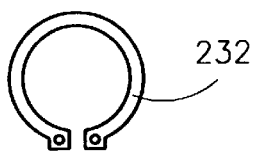

FIGS. 12C and 12D show pin 194 and a retaining grommet 232. Pin 194 has recessed collars 234 for receiving retaining grommets 232 which retain pin 194 within transverse bore 38.

Figure 13:
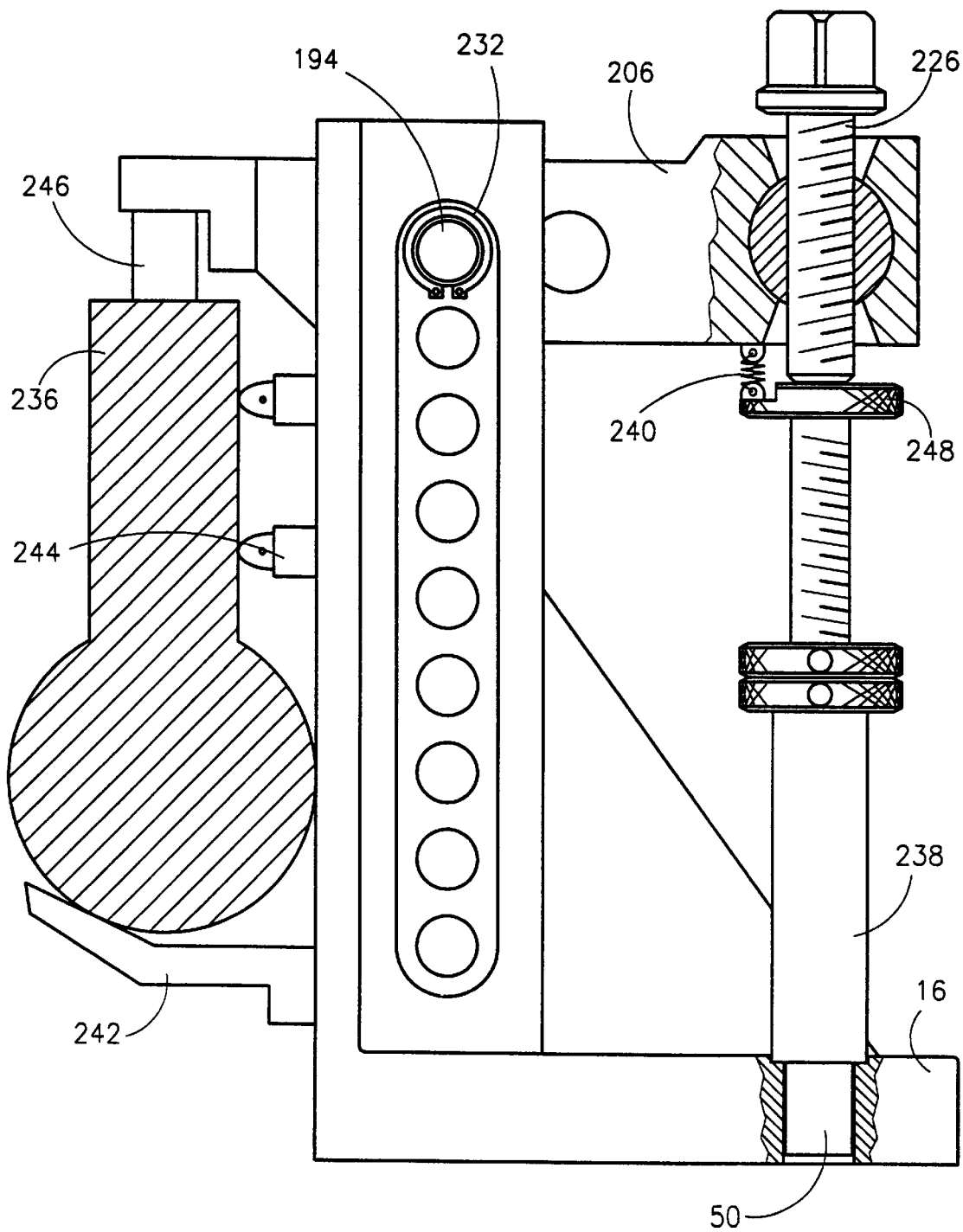
FIG. 13 is a cross-sectional side view of a first fixture illustrating the use of the lever arm of FIG. 12B.

FIG. 13 shows an application in which lever arm 206 is used with various clamping jaws and spacers to clamp a workpiece 236. Lever arm 206 is mounted on pin 194 which is located in one of transverse bores 38 in fixturing device 190. Pin 194 is held in position by retaining grommets 232.

Adjuster bolt 226, in this case, cooperates with an adjustable support 238, and a return spring 240 urges lever arm 206 to its inoperative position. Adjustable support 238 is located in one of mounting holes 50 in base 16.

In this case, a V-block 242 and two adjustable spacers 244 are used to support workpiece 236, and a jaw 246 is bolted to clamp-mount 222. These accessories are of conventional designs, adapted where necessary to the features of clamping plate 12, to be attached, for example, to threaded recesses 42. Other such accessories may be substituted as required for different applications.

In use, locating and supporting components are selected and positioned on clamping plate 12 as appropriate for a given workpiece, and a jaw is chosen. Pin 194 locates lever arm 206 in transverse bore 38 closest to the required position, and adjuster bolt 226 is turned rotating lever arm 206 from its inoperative position to an operative position in which jaw 246 clamps workpiece 236.

The choice of pivot hole 220 varies the distance of jaw 246 from clamping plate 12. Additionally, pivot hole 220 closer to clamp-mount 222 provides higher clamping force, while the further one allows a wider range of adjustment. Adjustable support 238 is located in one of holes 50 corresponding to the choice of pivot hole 220, and is adjusted to provide a cooperating surface 248 for adjuster bolt 226 when pivot arm 206 is in the required position. Rotatable cylinder 230 maintains adjuster bolt 226 substantially perpendicular to cooperating surface 248, thus minimizing wear on adjuster bolt 226.

Figure 14:
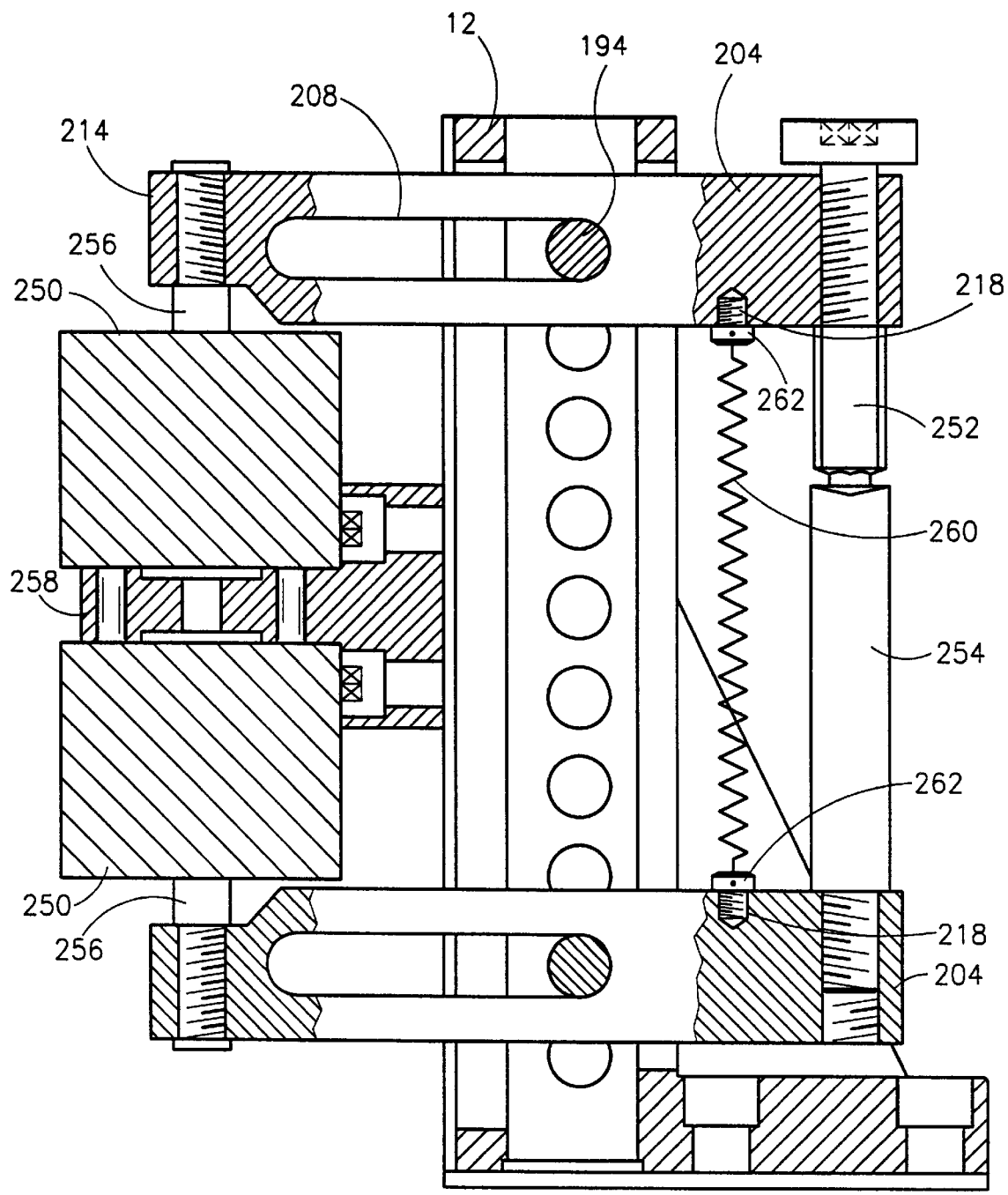
FIG. 14 is a cross-sectional side view of a second fixture illustrating the use of the lever arm of FIG. 12A.

FIG. 14 shows a further application in which two lever arms 204 are used opposingly to clamp two workpieces 250. In this application, an adjuster bolt 252 engaged in one lever arm 204 cooperates with a support bolt 254 which abuts the second lever arm 204. When adjuster bolt 252 is turned, both lever arms 204 rotate, clamping workpieces 250 between jaws 256 and a two-sided base plate 258. A long return spring 260 is mounted on screw elements 262 in sockets 218.

Pivot slots 208 in lever arms 204 allow lever arms 204 to be withdrawn for easy positioning and removal of different shapes of workpieces. The position of each lever arm 204 is maintained during clamping by the pressure of pin 194 against the side of pivot slot 208.

Figure 15:
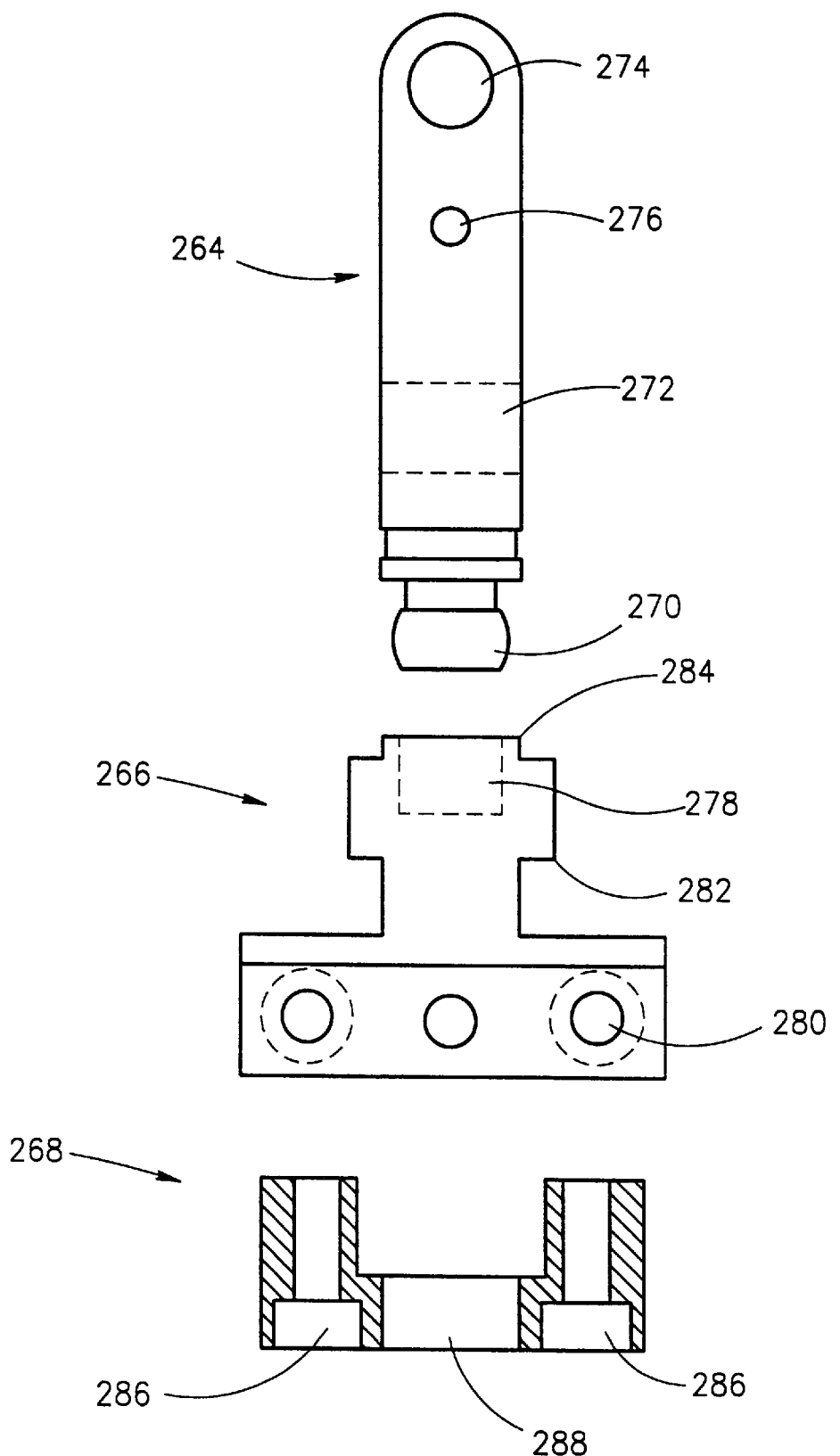
FIG. 15 is a top view of the elements of a clamping mechanism for use in the implementation of FIG. 11.

FIG. 15 shows the components of a further clamping mechanism for use with fixturing device 190, having locating groove 40. There are shown a toggle lever 264, a closing jaw 266 and a closing jaw holder 268. Toggle lever 264 has a toggle head 270, a pivot hole 272, a threaded hole 274 to receive an adjuster bolt, and a socket 276 for attaching a return spring. Closing jaw 266 has a socket 278 for receiving toggle head 270, and holes 280 for receiving clamping jaws. It also has shoulders 282 to cooperate with closing jaw holder 268, and projections 284. Closing jaw holder 268 has bolt holes 286 for fixing to clamping plate 12, and a central slot 288 within which closing jaw 266 slides.

Figure 16:
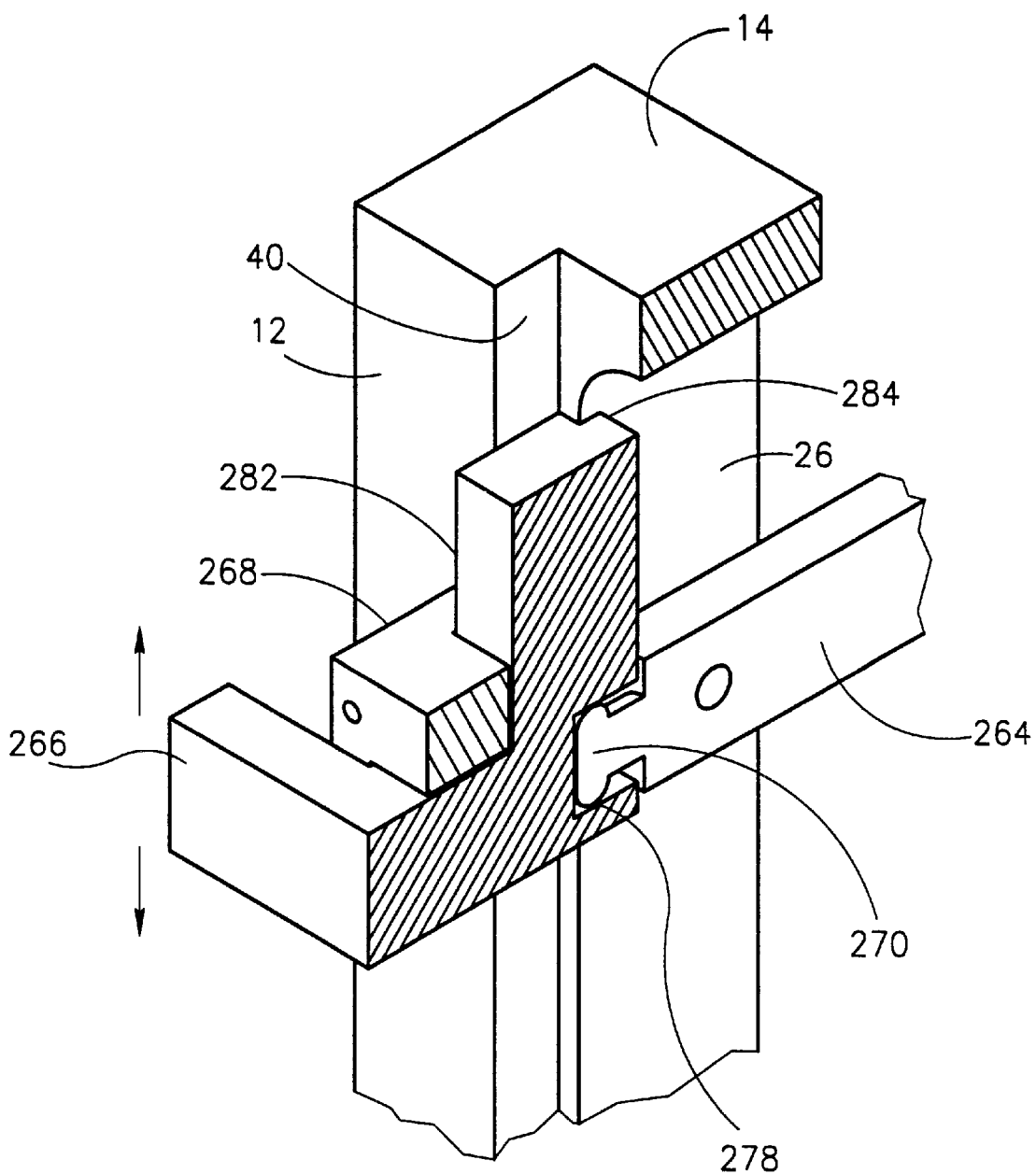
FIG. 16 is a cut-away perspective view illustrating the operation of the clamping mechanism of FIG. 15.

FIG. 16 illustrates the operation of this mechanism. Closing jaw holder 268 is fixed to clamping plate 12, thereby defining a channel within which closing jaw 266 is slidable. Toggle head 270 is engaged in socket 278 so that rotation of toggle lever 264 opens and closes closing jaw 266. The movement of closing jaw 266 is precisely linear, shoulders 282 cooperating with the inner surface of closing jaw holder 268, and projections 284 cooperating with locating groove 40.

In this application, the face 18 must have some of threaded recesses 42 near its outer edge. Typically, the top four locating bores 44 are replaced by threaded recesses 42.

Figure 17:
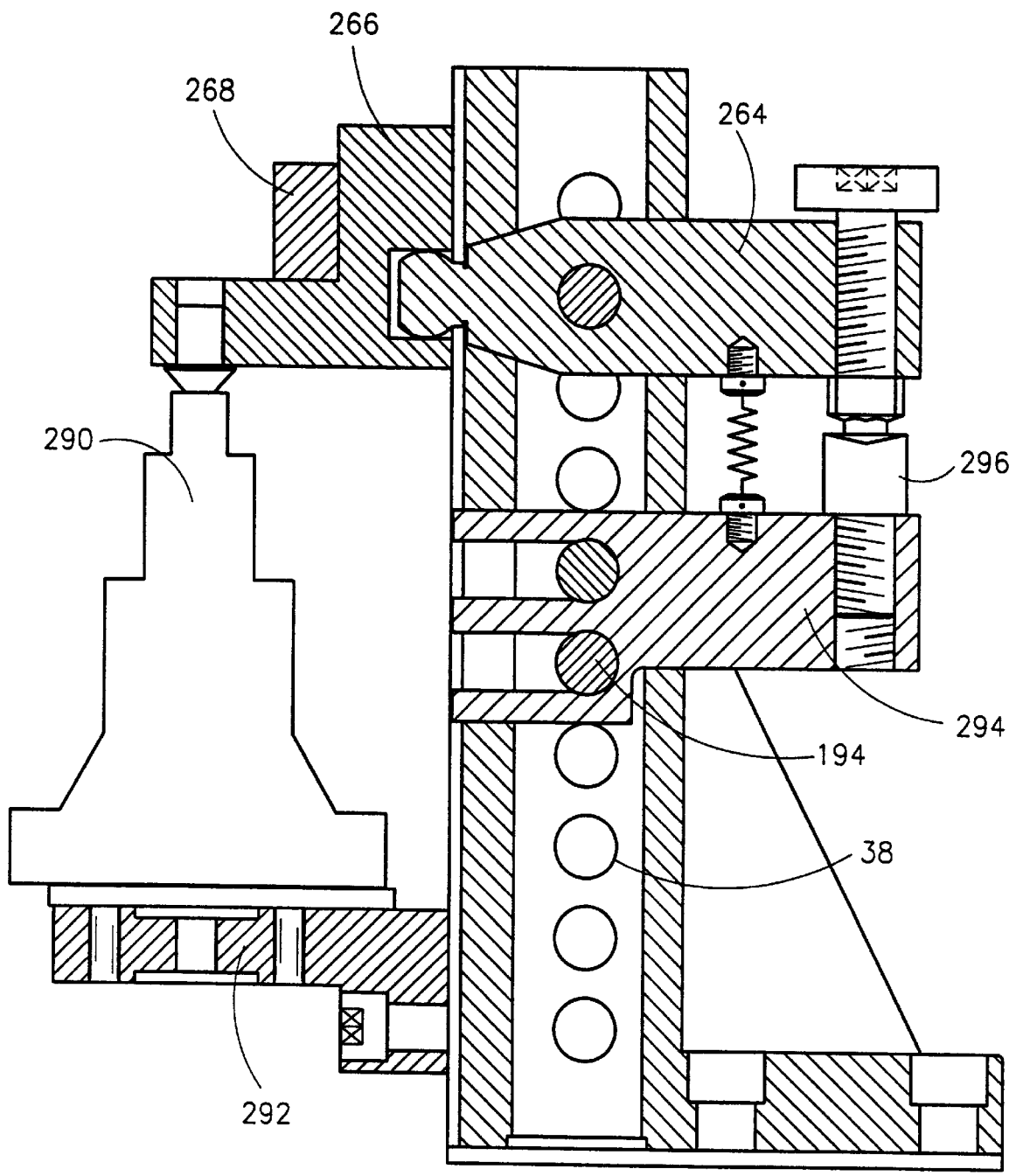
FIG. 17 is a cross-sectional side view of a fixture illustrating the use of the clamping mechanism of FIG. 15.

FIG. 17 shows an application of this mechanism in which a workpiece 290 is clamped by closing jaw 266 against an angle base plate 292. In this example, adjustable support 238 (of FIG. 13) is replaced by an alternative abuttal surface, including a stop plate 294 and a support bolt 296. Stop plate 294 is mounted on a further two pins 194, enabling it to be repositioned when toggle lever 264 is mounted in a different transverse bore 38.

Adjustable support 238 and stop plate 294 are generally interchangeable. Other mechanisms may also be used to actuate the various lever arms. Other examples include hydraulic and pneumatic jacks, which may be manually or automatically controlled.

It should be appreciated that these three clamping techniques are complimentary, the preferred embodiments enabling use of any combination thereof, as required. Similarly, the features described within each specific implementation are not limited to those combinations, but may be used in association with other features described in other applications. Thus fixturing components, meaning clamping, locating and supporting elements of both novel and conventional designs, may be combined to construct adjustable fixtures with increased accessibility for a very large variety of workpieces.

It will be appreciated that the above descriptions are intended only to serve as examples, and that many other embodiments are possible within the scope and the spirit of the invention.

What is claimed:

1. A modular fixturing system for supporting a clamp for clamping a workpiece, the modular fixturing system comprising:

(a) a fixturing device having a front face, a back face, a slot traversing from said back face to said front face, and at least three transverse bores traversing the fixturing device and intersecting and spaced along said slot, said transverse bores receiving a pin for pivotal mounting of a clamping means within said slot, said fixturing device further featuring a shaft intersecting with said slot;

(b) a clamp support for supporting the clamp, said clamp support displaceable along said shaft; and (c) securing means for securing said clamp support relative to the fixturing device.

2. A fixturing device as in claim 1, wherein said front face has a plurality of threaded recesses for attaching a fixturing component.

3. A fixturing device as in claim 1, wherein said front face has a plurality of accurately positioned bores for locating a fixturing component.

4. A fixturing device as in claim 1, wherein said shaft has a central axis extending parallel to both said front face and to said slot.

5. A modular fixturing system for clamping a workpiece during machining, the modular fixturing system comprising:

(a) a fixturing device having at least three transverse bores;

(b) a first pin locatable in a first one of said transverse bores;

(c) a second pin locatable in a second one of said transverse bores;

(d) a first clamping means pivotally mounted on said first pin so as to be displaceable between an inoperative position and an operative position in which it clamps the workpiece;

(e) a second clamping means pivotally mounted on said second pin;

(f) actuating means for effecting angular displacement of said first clamping means about said first pin so as to dispose said first clamping means from said inoperative position to said operative position, said actuating means also effecting an angular displacement of said second clamping means opposing the angular displacement of said first clamping means.

6. A fixturing device as in claim 5, having a plurality of threaded recesses for attaching a fixturing component.

7. A fixturing device as in claim 5, having a plurality of accurately positioned bores for locating a fixturing component.

8. A modular fixturing system as in claim 5, wherein said first clamping means has a plurality of pivot holes for receiving said first pin.

9. A modular fixturing system as in claim 5, wherein said first clamping means includes a closing jaw, said angular displacement producing a linear displacement of said closing jaw along the fixturing device.

10. A modular fixturing system as in claim 5, wherein said first clamping means has a threaded bore, and wherein said actuating means includes a bolt adjustably receivable within said threaded bore.

* * * * *